United States Patent
Cha et al.

(10) Patent No.: US 11,569,883 B2
(45) Date of Patent: Jan. 31, 2023

(54) METHOD FOR PERFORMING BEAM-RELATED REPORTING IN WIRELESS COMMUNICATION SYSTEM AND APPARATUS THEREFOR

(71) Applicant: LG ELECTRONICS INC., Seoul (KR)

(72) Inventors: Hyunsu Cha, Seoul (KR); Jiwon Kang, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/290,665

(22) PCT Filed: Nov. 4, 2019

(86) PCT No.: PCT/KR2019/014866
§ 371 (c)(1),
(2) Date: Apr. 30, 2021

(87) PCT Pub. No.: WO2020/091576
PCT Pub. Date: May 7, 2020

(65) Prior Publication Data
US 2021/0376894 A1      Dec. 2, 2021

Related U.S. Application Data

(60) Provisional application No. 62/755,280, filed on Nov. 2, 2018.

(30) Foreign Application Priority Data

Dec. 13, 2018   (KR) .................. 10-2018-0161088

(51) Int. Cl.
*H04B 7/06*      (2006.01)
*H04L 5/00*      (2006.01)

(52) U.S. Cl.
CPC ......... *H04B 7/0619* (2013.01); *H04B 7/0695* (2013.01); *H04L 5/0051* (2013.01)

(58) Field of Classification Search
CPC .. H04B 7/0619; H04B 7/0695; H04B 7/0602; H04B 7/0691; H04L 5/0051
See application file for complete search history.

(56) References Cited

U.S. PATENT DOCUMENTS

2017/0302341 A1*  10/2017  Yu ........................ H04B 7/0695
2018/0103407 A1    4/2018  Nagaraja et al.
2020/0178134 A1*  6/2020  Yang ............... H04W 36/00837

FOREIGN PATENT DOCUMENTS

WO       2017123079       7/2017

OTHER PUBLICATIONS

PCT International Application No. PCT/KR2019/014866, International Search Report dated Feb. 19, 2020, 5 pages.

(Continued)

*Primary Examiner* — Sophia Vlahos
(74) *Attorney, Agent, or Firm* — Lee Hong Degerman Kang Waimey

(57) ABSTRACT

Disclosed are a method for performing beam-related reporting in a wireless communication system and an apparatus therefor. Specifically, the method for user equipment (UE) for performing beam-related reporting in a wireless communication system comprises the steps of receiving configuration data from a base station (BS), the configuration data comprising data concerning the reporting period or reporting time of measurement data; receiving a reference signal (RS) from the BS on the basis of the configuration data; measuring on the basis of the RS; transmitting beam change request-related data to the BS on the basis of the measured and threshold values; and transmitting the measurement data to the BS, wherein the beam change request- (Continued)

related data can be transmitted before the reporting period or reporting time.

13 Claims, 17 Drawing Sheets

(56) References Cited

OTHER PUBLICATIONS

Qualcomm Incorporated, "Enhancements on Multi-beam Operation," 3GPP TSG-RAN WG1 Meeting#94bis, R1-1811278, Oct. 2018, 12 pages.
Ericsson, "New beam detection," 3GPP TSG-RAN WG4 Meeting AH1807, R4-1808799, Jul. 2018, 4 pages.
ZTE, "Maintenance for beam management," 3GPP TSG RAN WG1 Meeting #94bis, R1-1810214, Oct. 2018, 11 pages.

* cited by examiner

[Fig. 1]
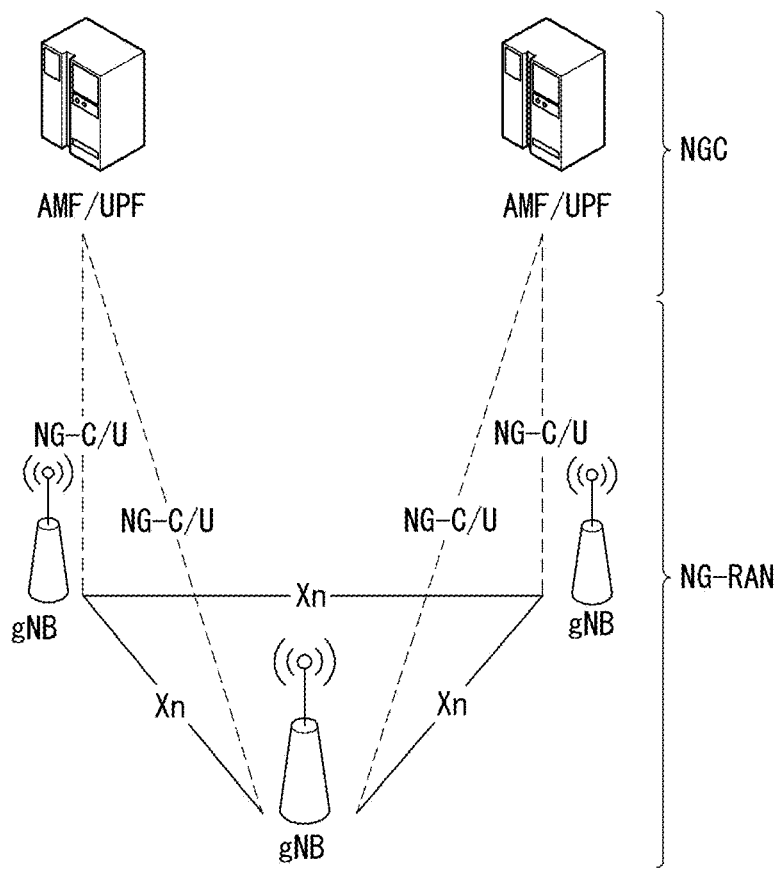
[Fig. 2]
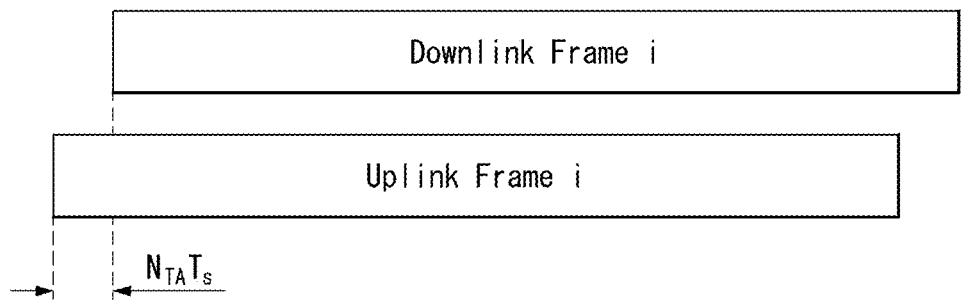

[Fig. 3]
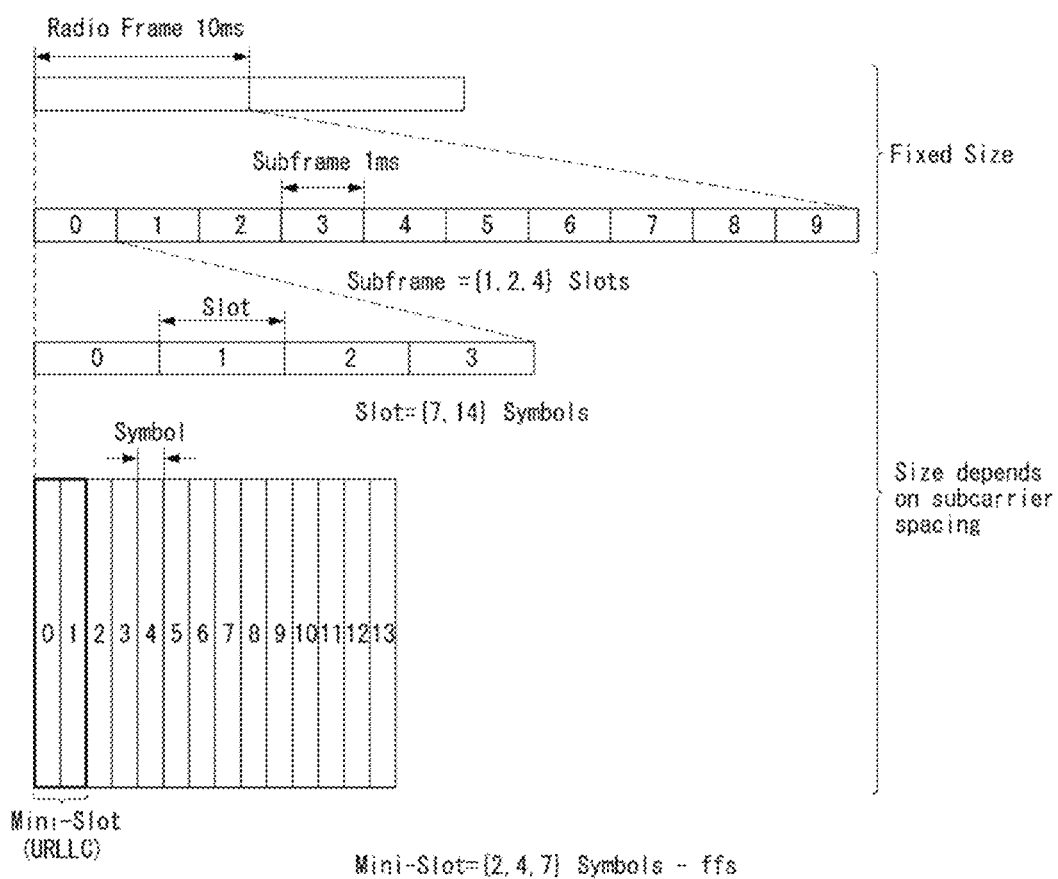

[Fig. 4]
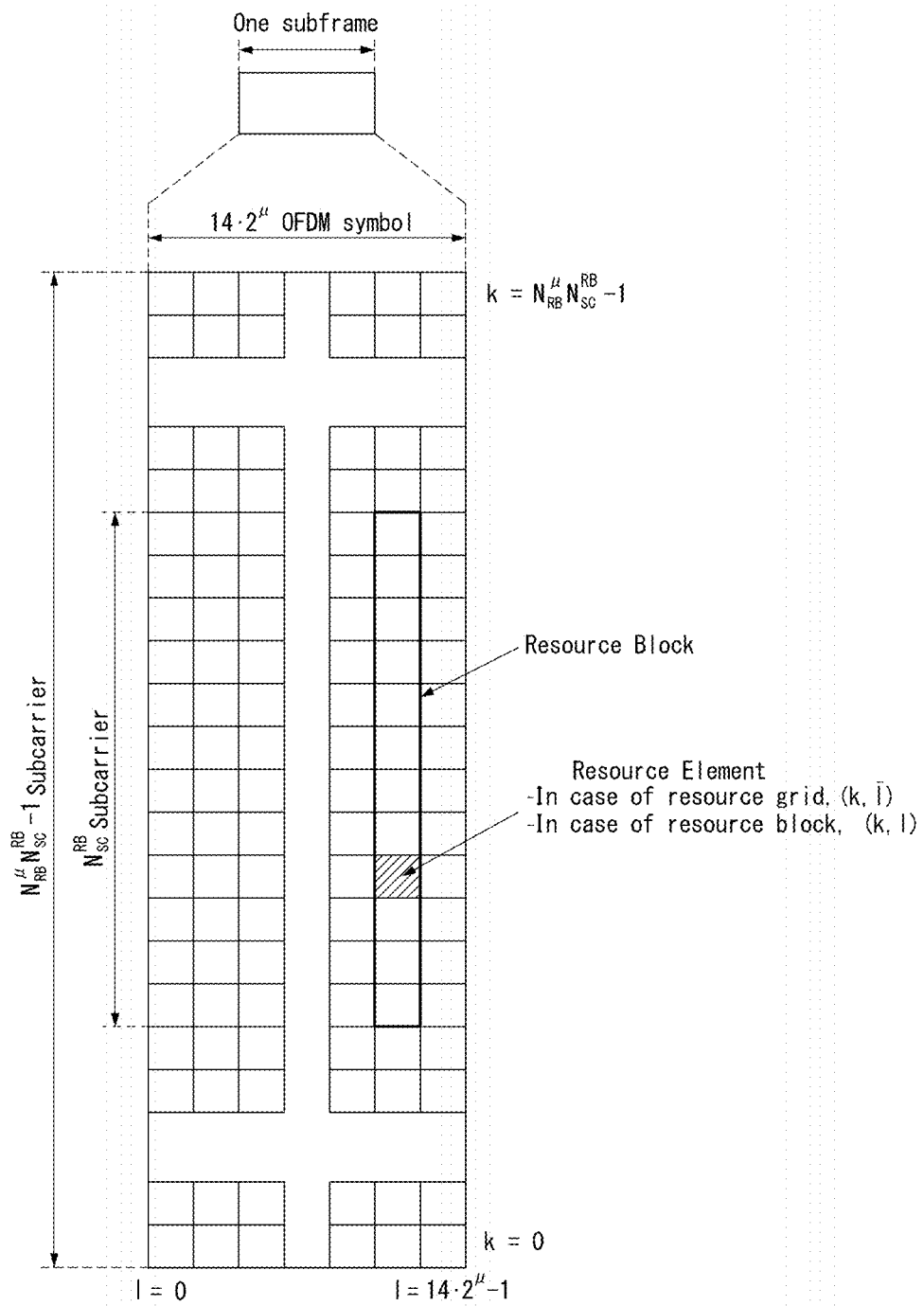

[Fig. 5]
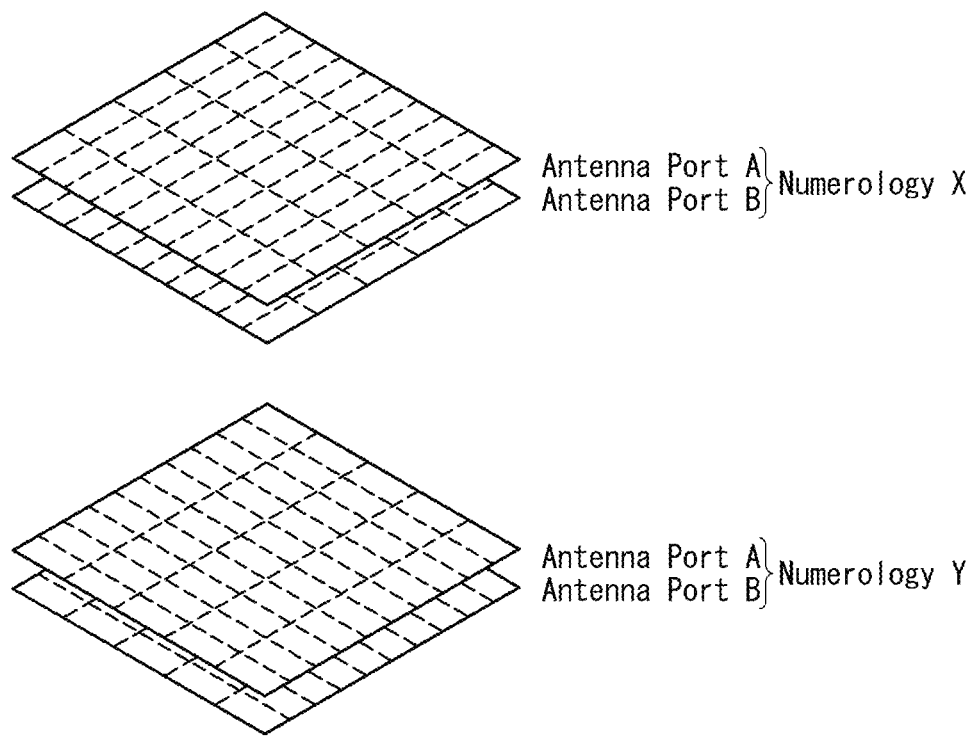
[Fig. 6]
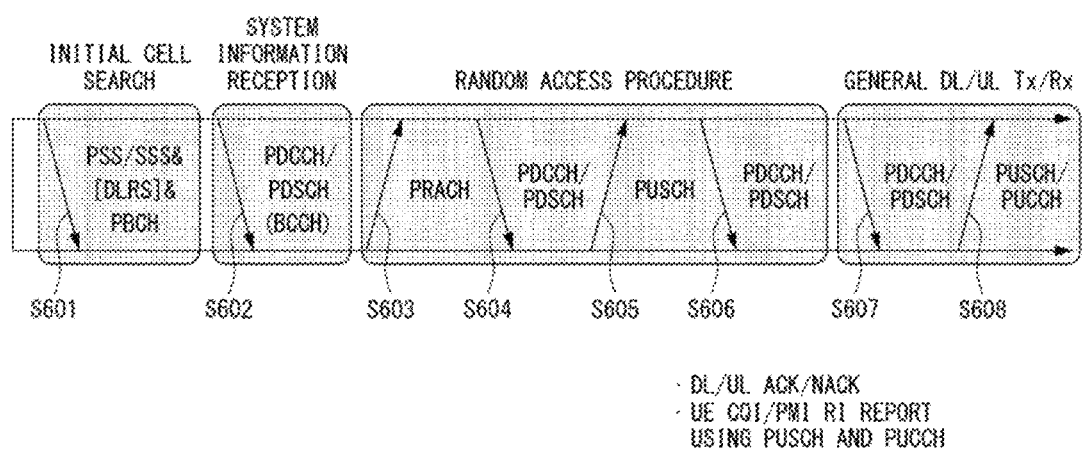

[Fig. 7]
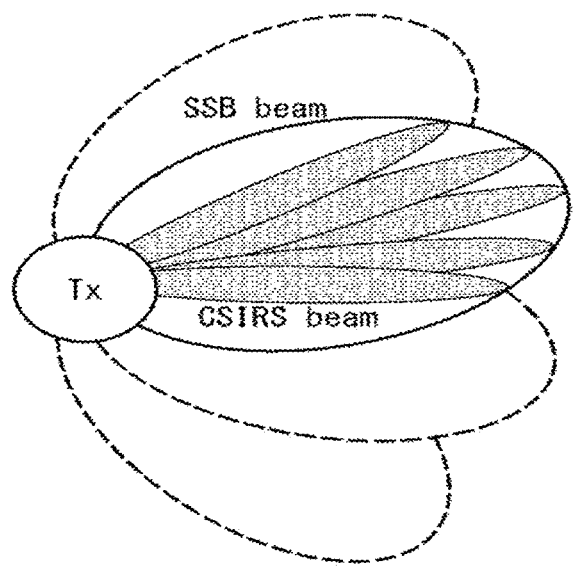
[Fig. 8]
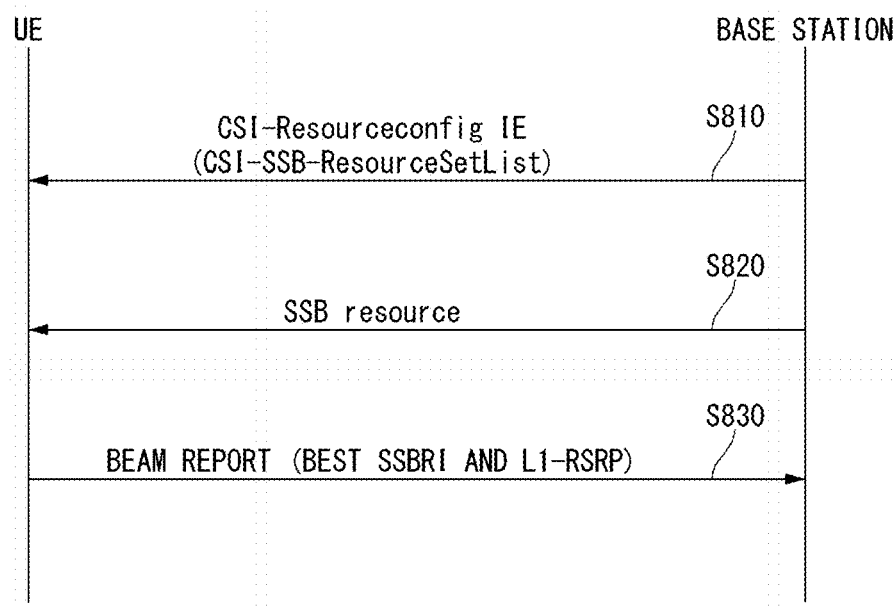

[Fig. 9]
(a)
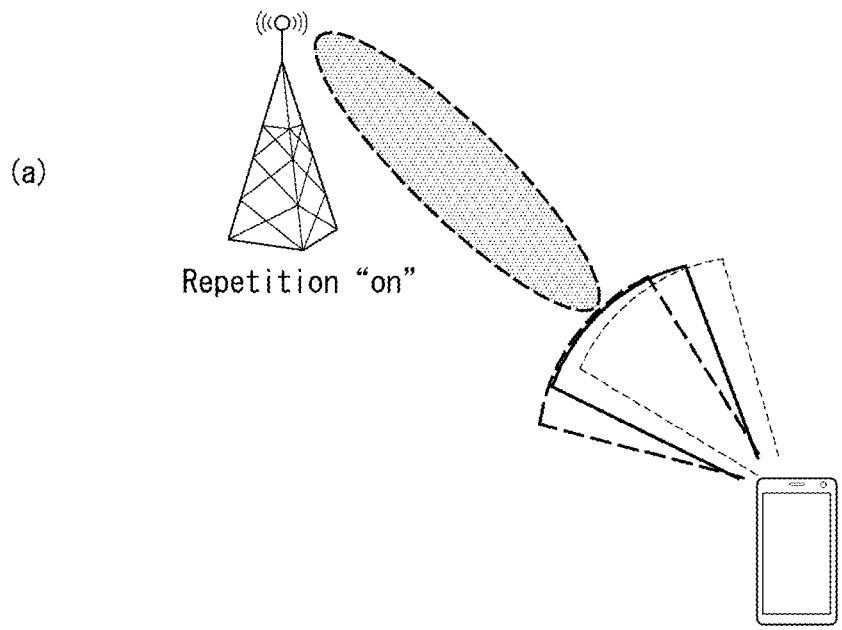
Repetition "on"
(b)
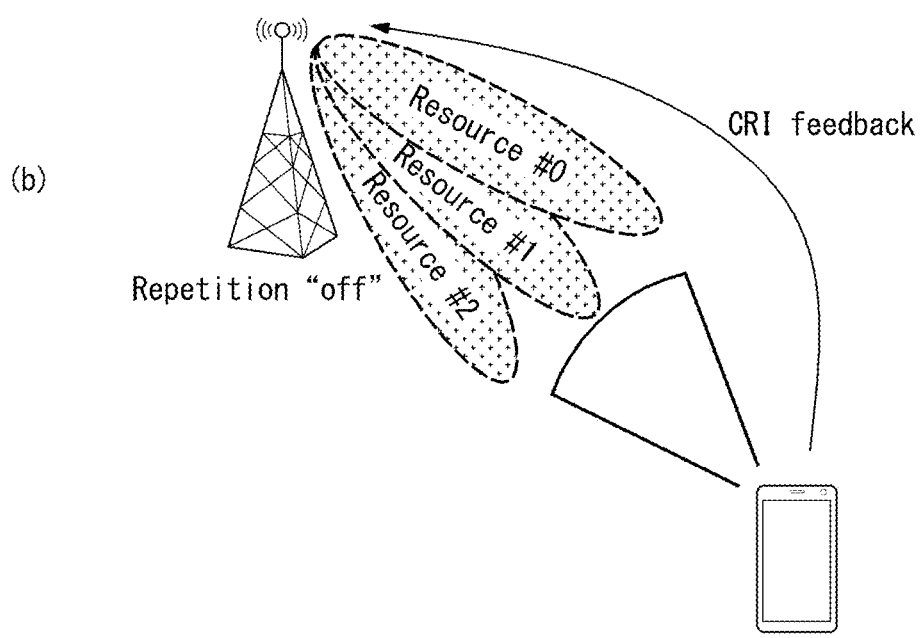
Repetition "off"

[Fig. 10]
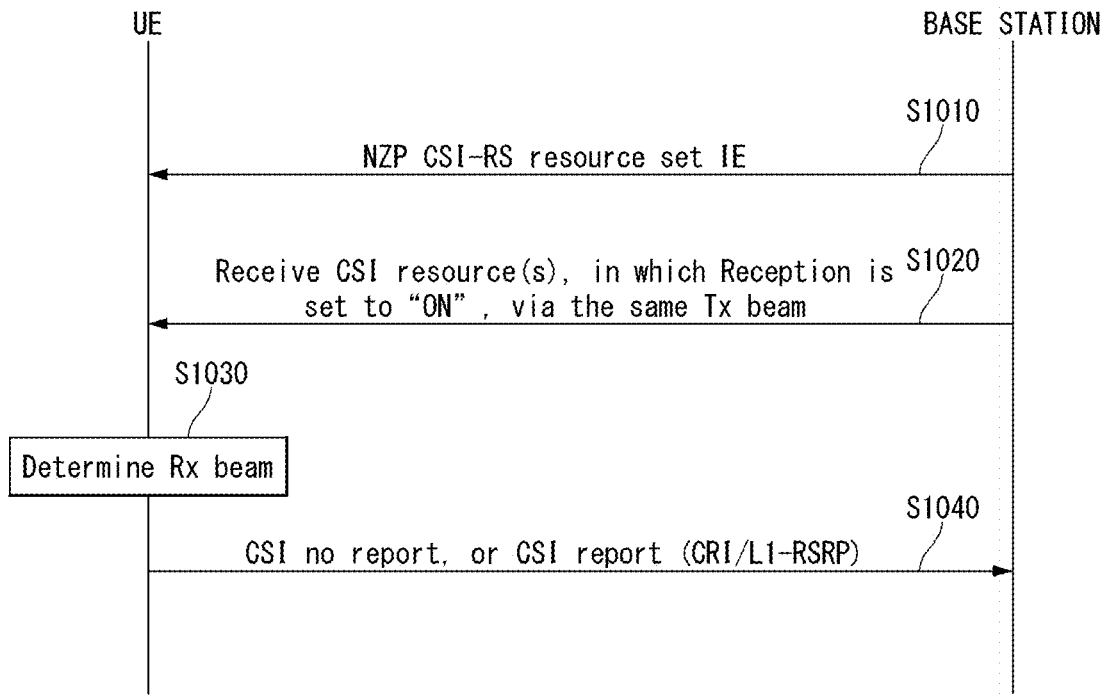
[Fig. 11]
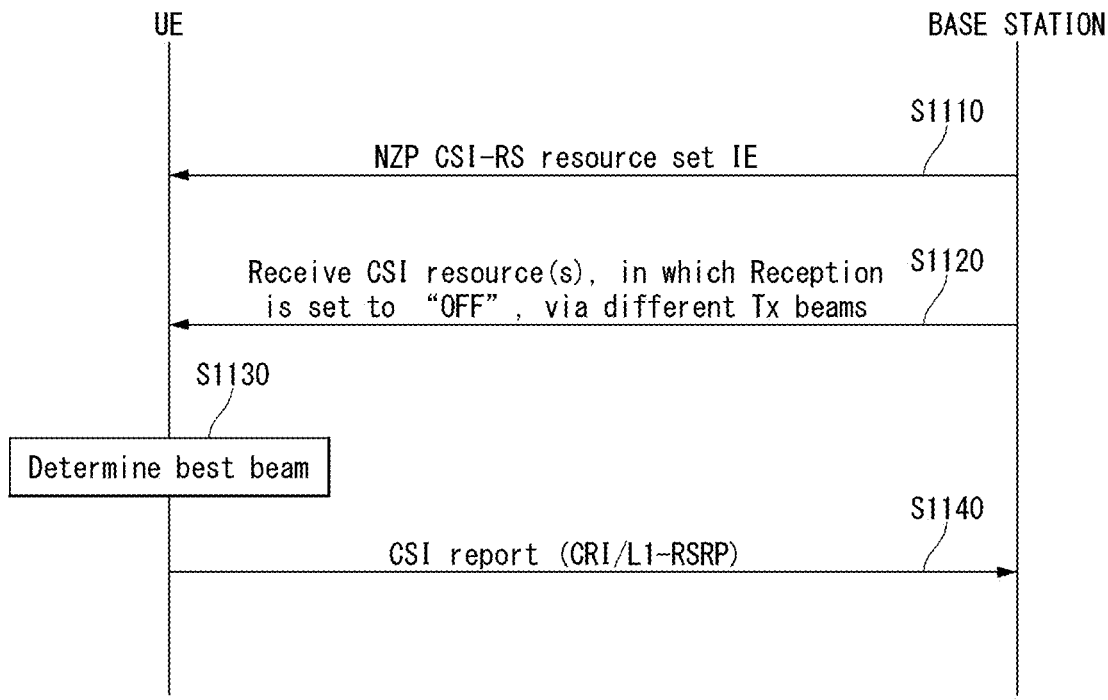

[Fig. 12]
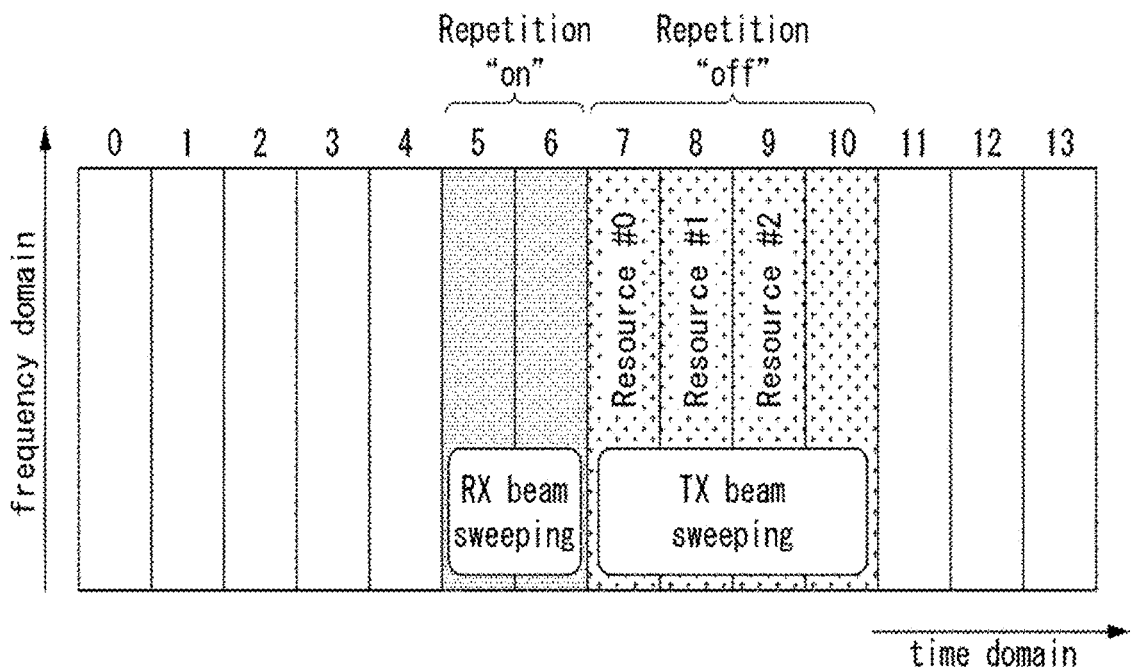
[Fig. 13]
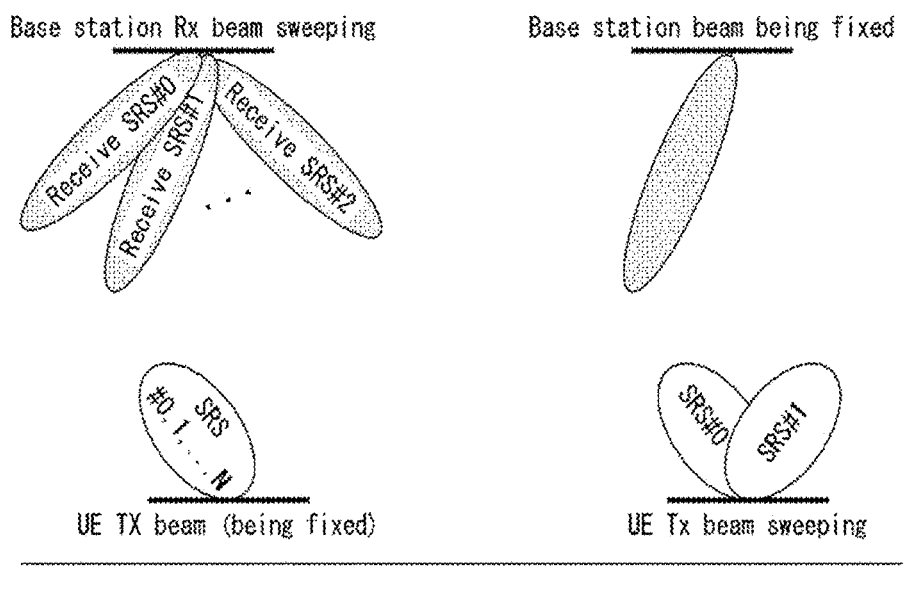
(a)   (b)

[Fig. 14]
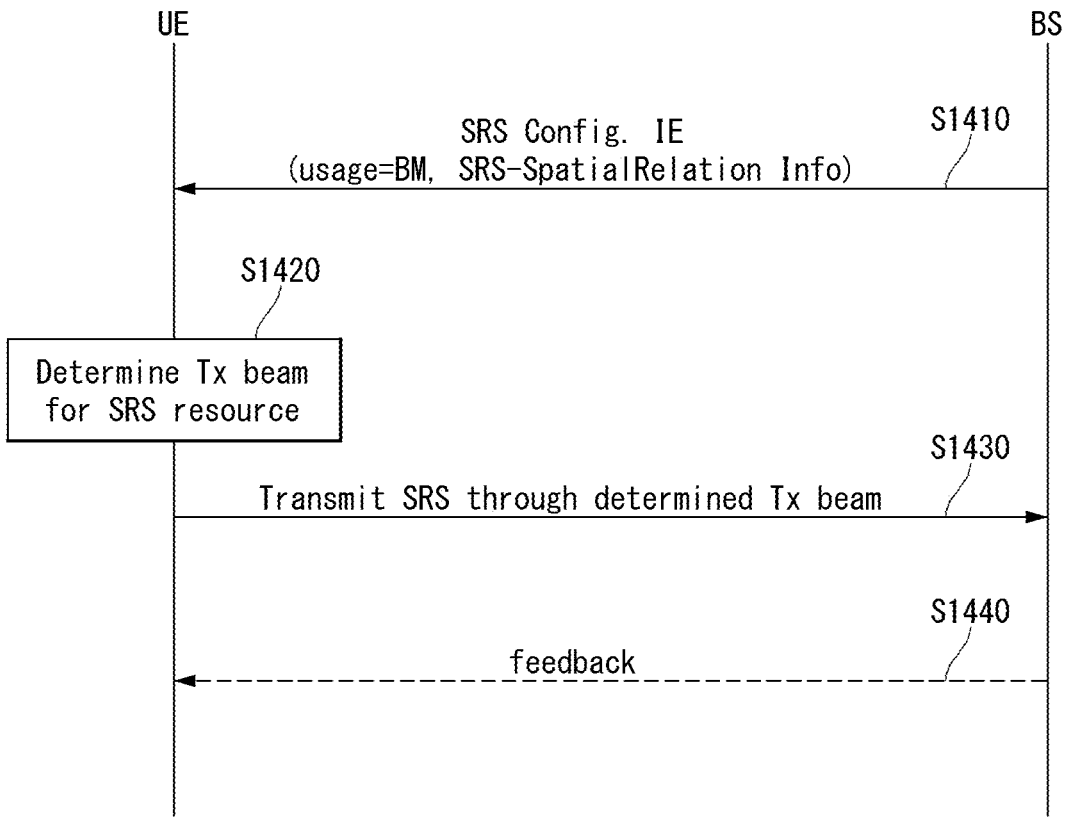
[Fig. 15]
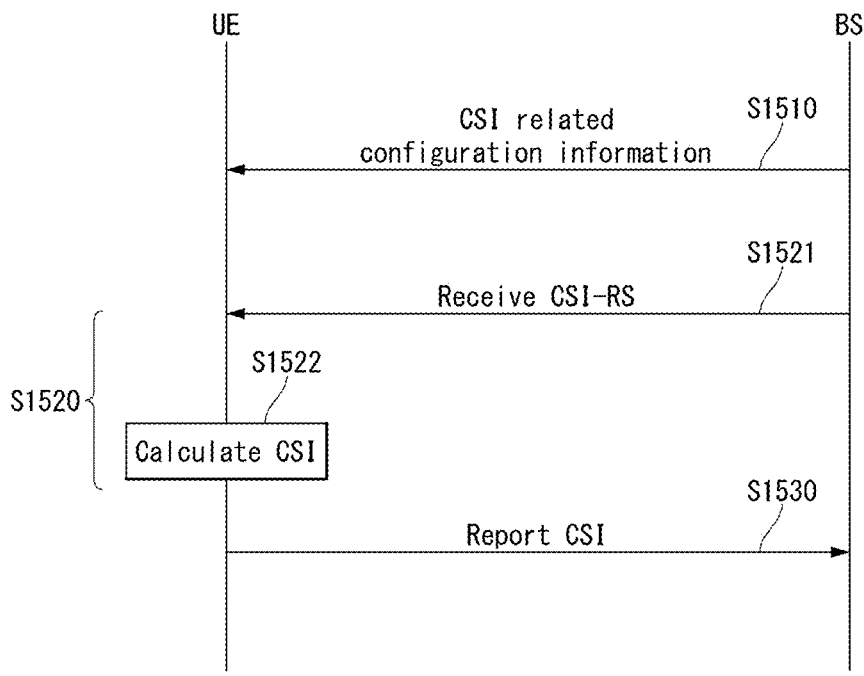

[Fig. 16]
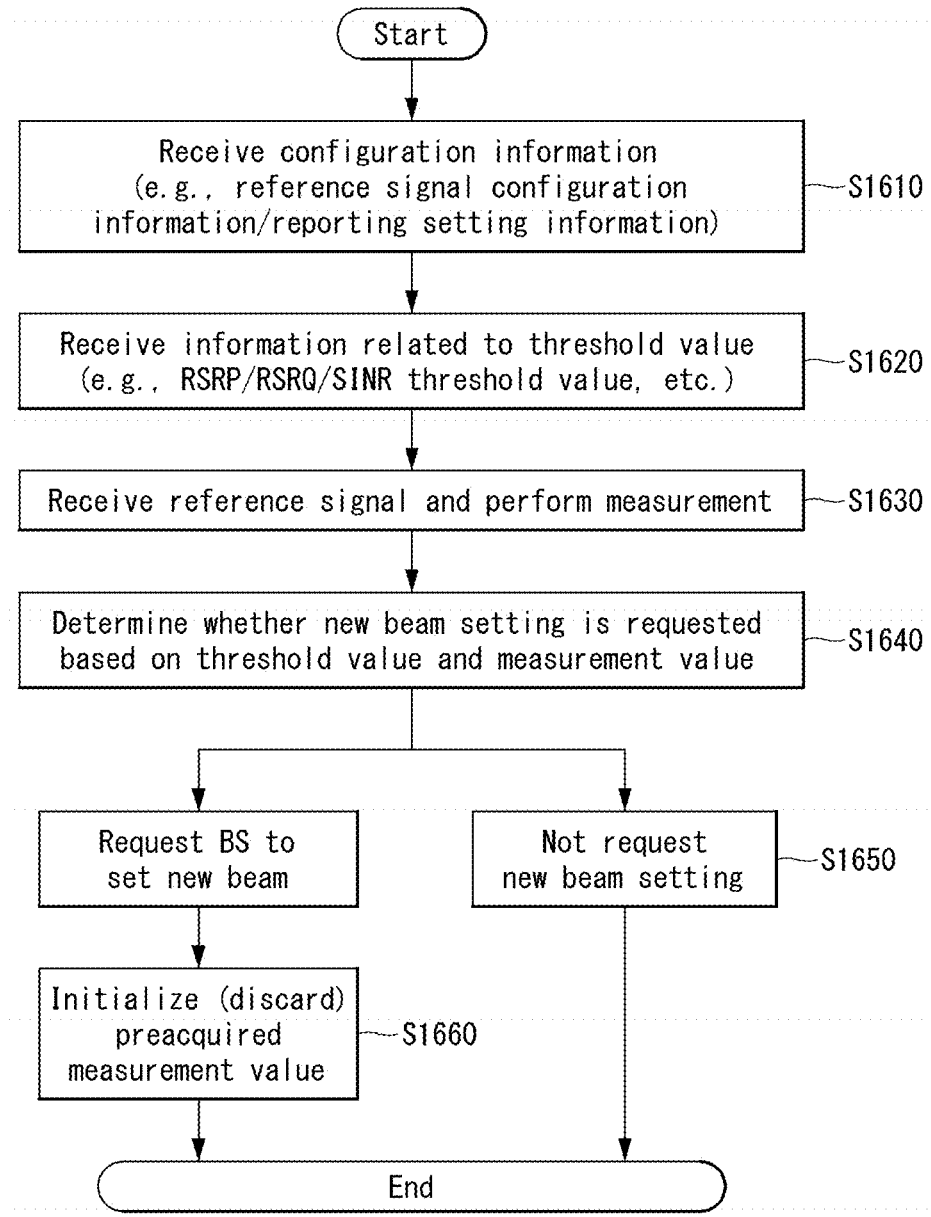

[Fig. 17]
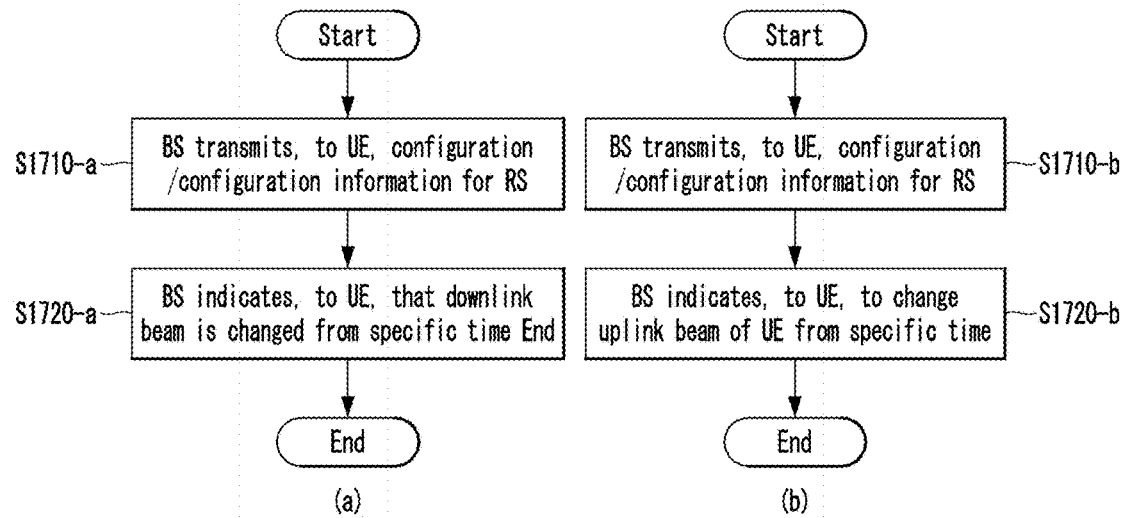
[Fig. 18]
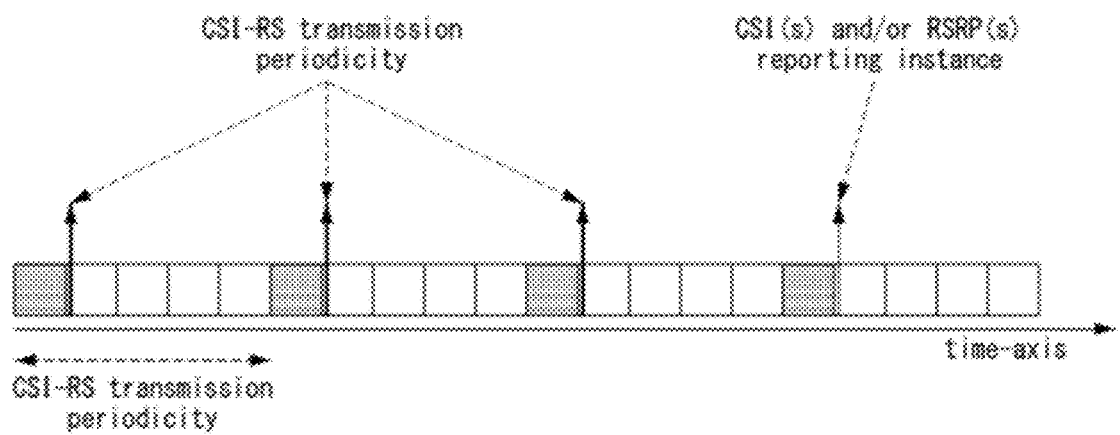

[Fig. 19]
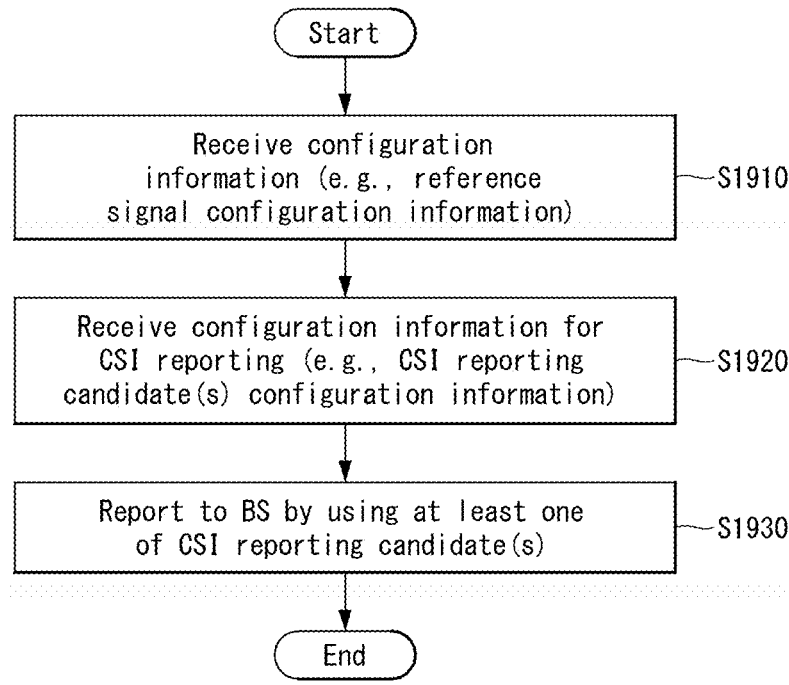
[Fig. 20]
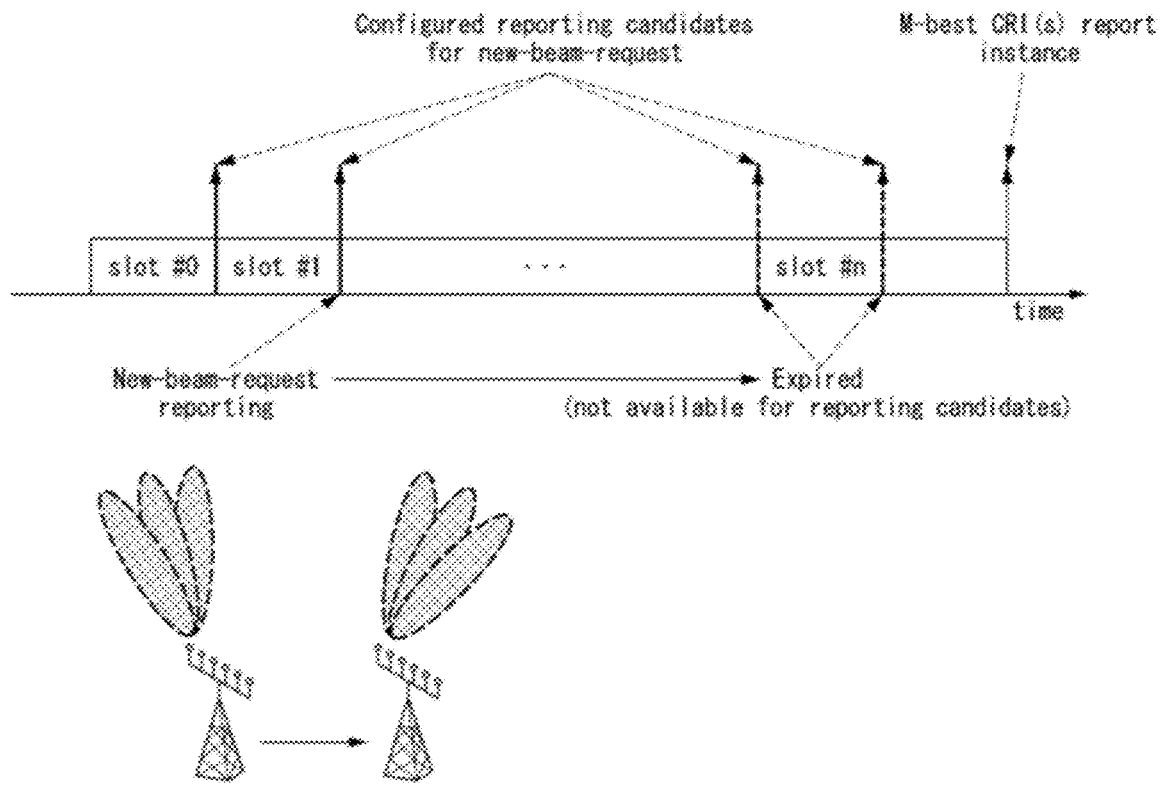

[Fig. 21]
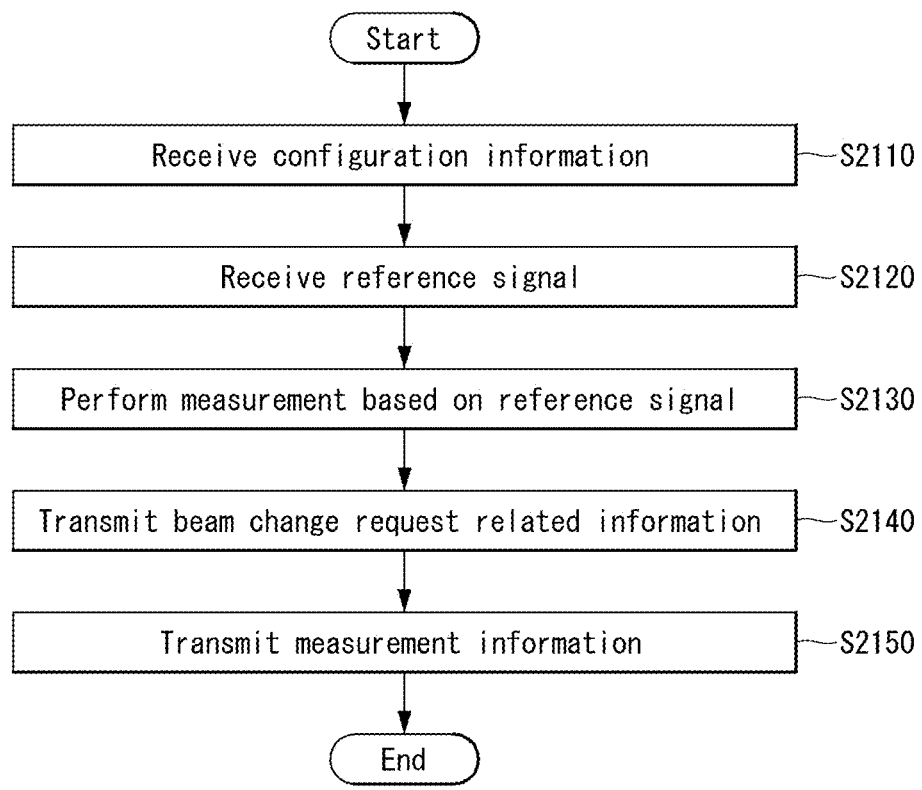

[Fig. 22]
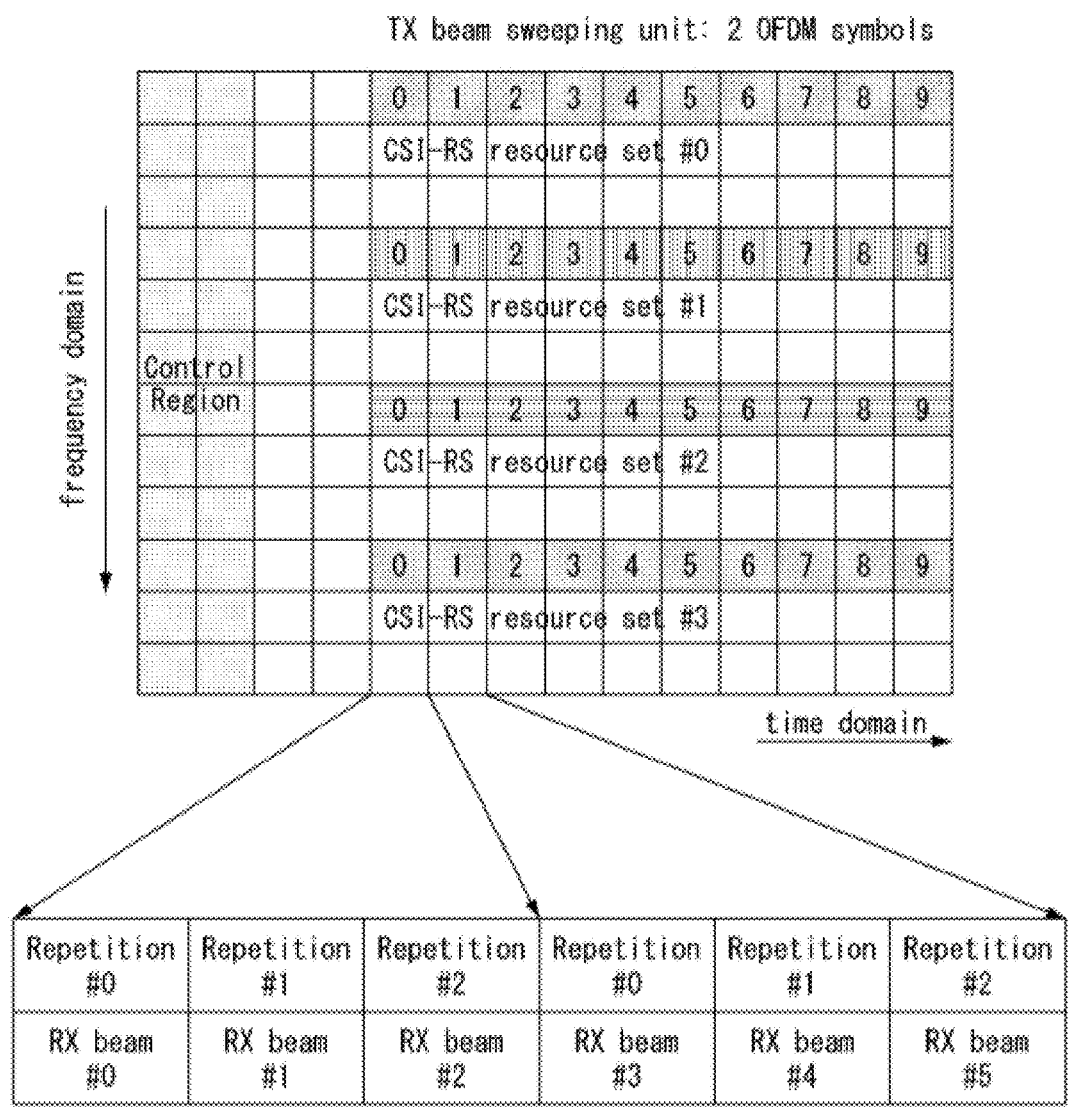

[Fig. 23]
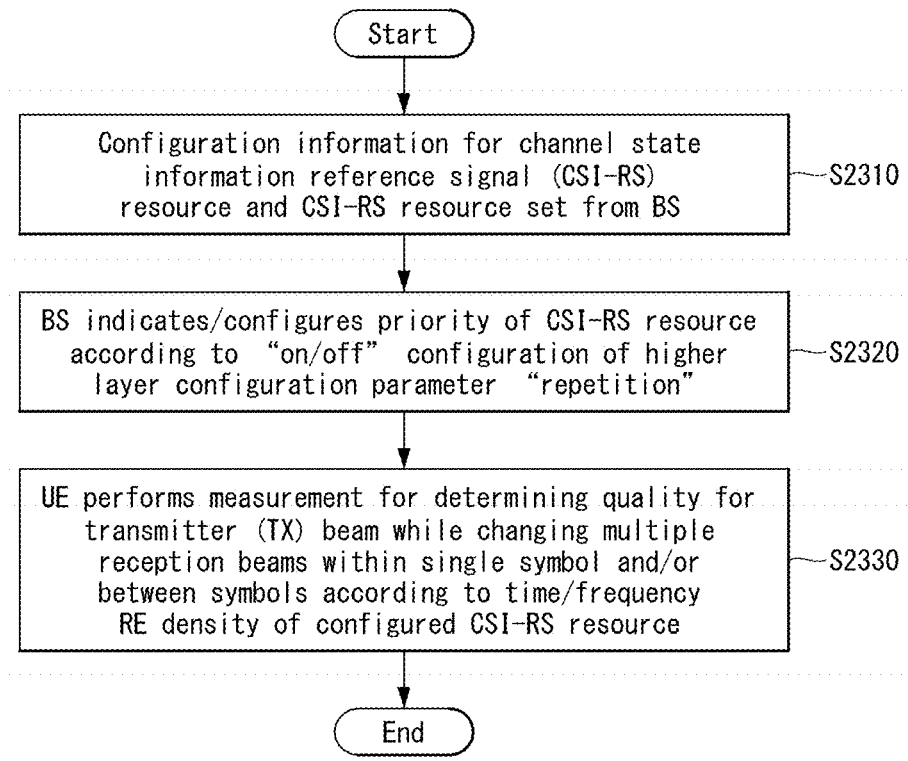
[Fig. 24]
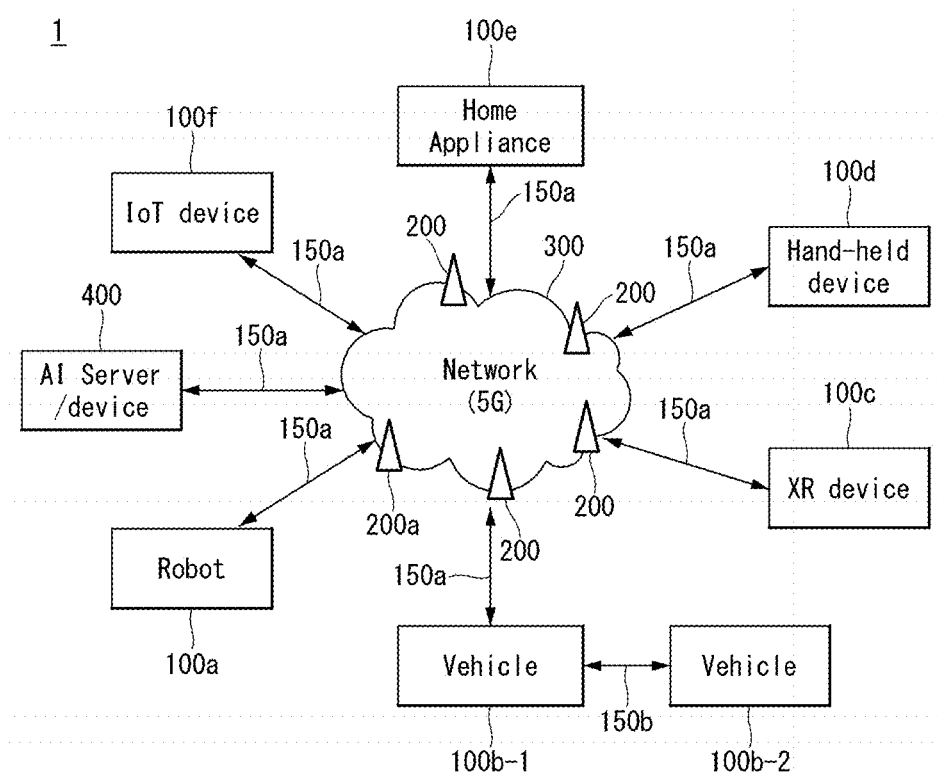

[Fig. 25]
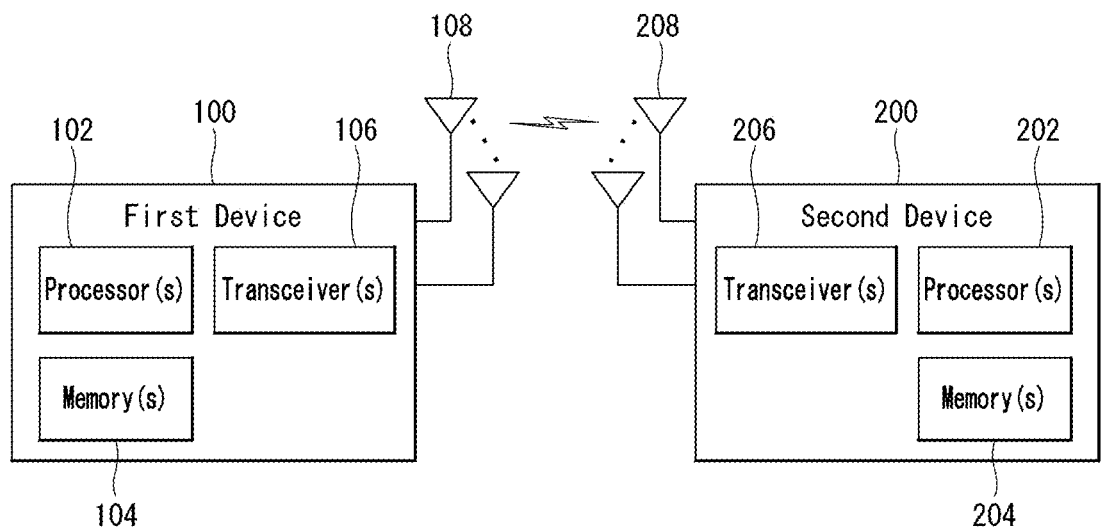
[Fig. 26]
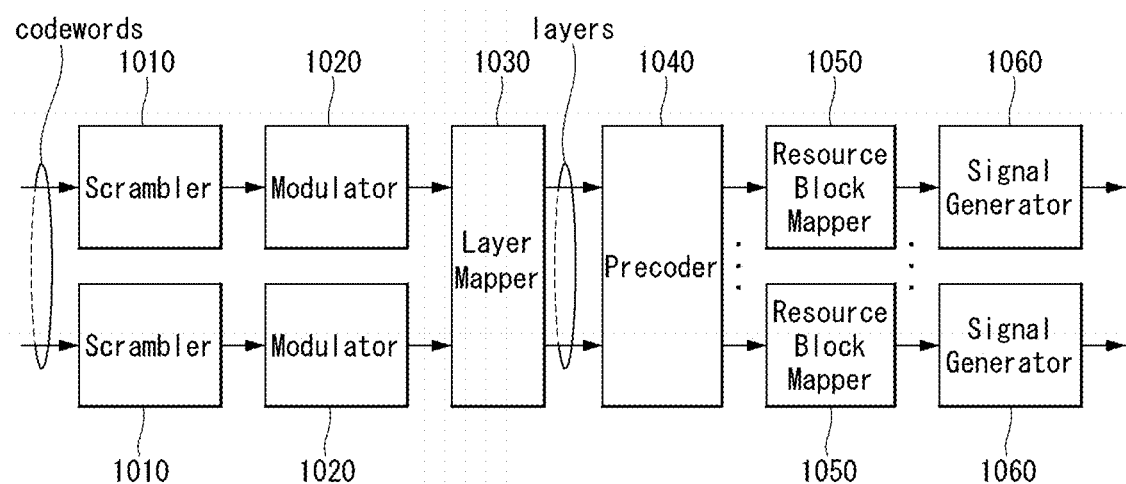

[Fig. 27]
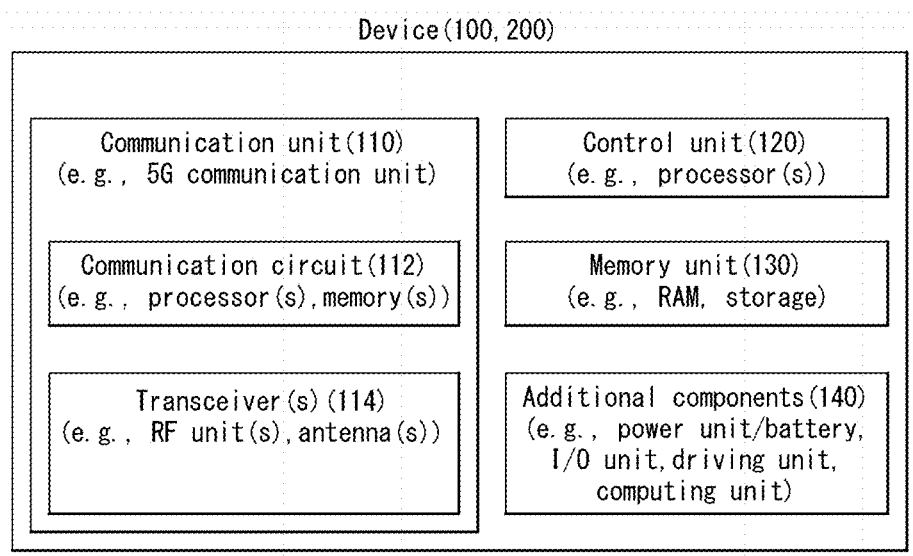
[Fig.28]
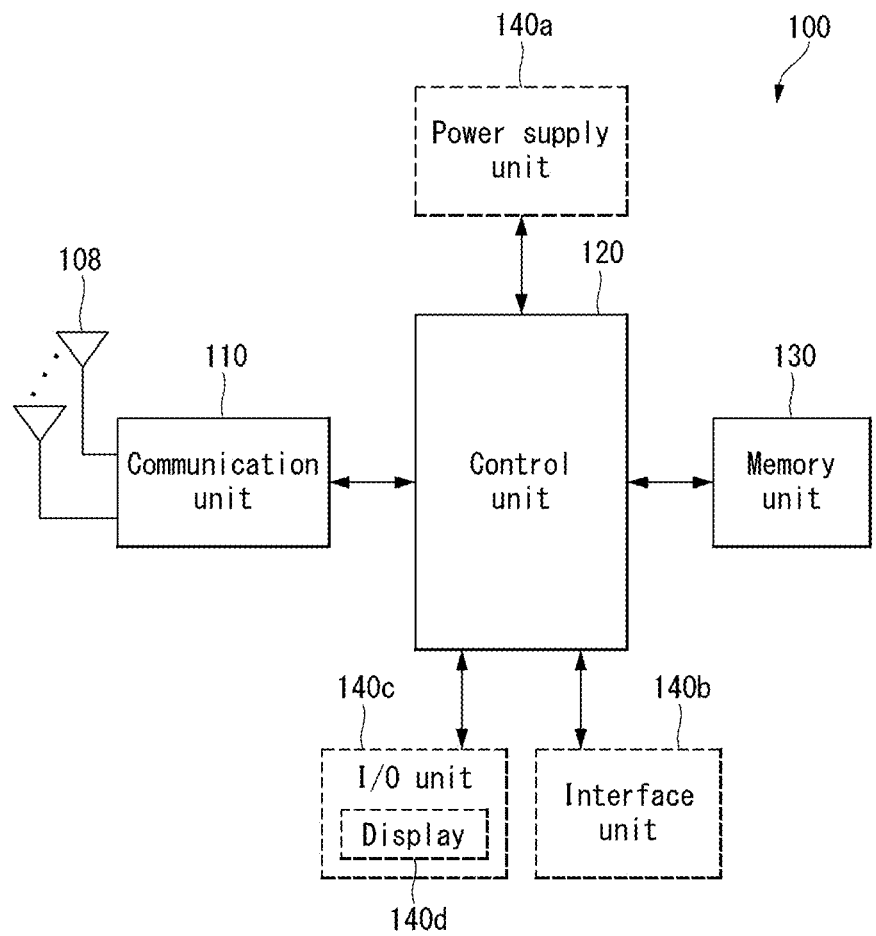

METHOD FOR PERFORMING BEAM-RELATED REPORTING IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/014866, filed on Nov. 4, 2019, which claims the benefit of earlier filing date and right of priority to Korean Application No. 10-2018-0161088, filed on Dec. 13, 2018, and also claims the benefit of U.S. Provisional Application No. 62/755,280, filed on Nov. 2, 2018, the contents of which are all incorporated by reference herein in their entireties.

TECHNICAL FIELD

The present disclosure relates to a wireless communication system, and more particularly, to a method for reducing a delay and overhead by reducing unnecessary measurement and/or reporting in a method for performing beam-related reporting and an apparatus for supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for performing beam-related reporting in a wireless communication system.

Specifically, the present disclosure proposes a method for requesting a beam change even before a reporting period or a reporting time set for beam-related reporting by comparing a result of performing measurement based on a reference signal and a threshold.

Further, the present disclosure proposes a method for determining a threshold used for determining whether a beam change request is required.

Further, the present disclosure proposes a method for processing (initializing) a result (e.g., measurement information, interference information, etc.) acquired by performing measurement before a request when a beam change is requested.

Further, the present disclosure proposes a method for performing a beam management operation based on a configuration of a parameter "repetition" related to a reference signal resource.

Further, the present disclosure proposes a method for performing a beam management operation based on the configuration of the parameter "repetition" related to the reference signal resource and mapping of a resource element of a frequency domain.

Technical problems to be solved by the present disclosure are not limited by the above-mentioned technical problems, and other technical problems which are not mentioned above can be clearly understood from the following description by those skilled in the art to which the present disclosure pertains.

Technical Solution

According to an embodiment of the present disclosure, a method for performing, by a user equipment (UE), beam-related reporting in a wireless communication system, which may include: receiving configuration information from a base station (BS), the configuration information including information on a reporting periodicity or a reporting time of measurement information; receiving, from the BS, a reference signal (RS) based on the configuration information; performing measurement based on the reference signal; transmitting, to the BS, information related to a beam change request based on a measurement value and a threshold value; and transmitting the measurement information to the BS, in which the transmission of the information related to the beam change request may be performed before the reporting periodicity or the reporting time.

Further, in the method according to an embodiment of the present disclosure, the configuration information may include a configuration related to reporting of the measurement information, and the configuration related to the reporting may be an indication of skipping the reporting of the measurement information.

Further, in the method according to an embodiment of the present disclosure, the threshold value may be set based on reception power information measured in an initial access step or a beam management step.

Further, in the method according to an embodiment of the present disclosure, the threshold value may be set to an average value of upper Y % among the reception power values, and the Y may be set by the BS.

Further, in the method according to an embodiment of the present disclosure, in (i) a case where the number of measurement values which exceeds the threshold value is smaller than the number of beams to be reported, (ii) a case where all of the measurement values is smaller than the threshold value, or (iii) a case where one of the measurement values is smaller than the threshold value, the information related to the beam change may be transmitted.

Further, in the method according to an embodiment of the present disclosure, the information related to the beam change request may include a request for changing beams corresponding to some of multiple reference signal resources configured to the UE.

Further, in the method according to an embodiment of the present disclosure, the information related to the beam change request may include a request for changing a beam of a neighboring cell, which causes interference to the UE.

Further, in the method according to an embodiment of the present disclosure, the information related to the beam change request may be transmitted at every transmission periodicity of the reference signal.

Further, in the method according to an embodiment of the present disclosure, the measurement information may be calculated by excluding a value measured before transmitting the information related to the beam change request.

Further, in the method according to an embodiment of the present disclosure, a value may be determined, which is excluded based on the transmission periodicity of the reference signal and a time used for the beam change of the BS.

Further, in the method according to an embodiment of the present disclosure, multiple resources for the beam-related reporting may be configured within the reporting periodicity or the reporting time based on the configuration information, and at least one of the information related to the beam change request or the measurement information may be transmitted through one of the multiple resources.

Further, in the method according to an embodiment of the present disclosure, when the measurement information is transmitted, at least one of rate matching or a measurement operation may be stopped.

According to an embodiment of the present disclosure, a user equipment (UE) performing beam-related reporting in a wireless communication system may include: one or more transceivers; one or more processors; and one or more memories storing instructions for operations executed by the one or more processors and connected to the one or more processors, in which the operations may include receiving configuration information from a base station (BS), the configuration information including information on a reporting periodicity or a reporting time of measurement information; receiving, from the BS, a reference signal (RS) based on the configuration information; performing measurement based on the reference signal; transmitting, to the BS, information related to a beam change request based on a measurement value and a threshold value; and transmitting the measurement information to the BS, and the information related to the beam change request may be transmitted before the reporting periodicity or the reporting time.

Further, in the UE according to an embodiment of the present disclosure, the threshold value may be set based on reception power information measured in an initial access step or a beam management step.

According to an embodiment of the present disclosure, an apparatus includes: one or more memories; and one or more processors functionally connected to the one or more memories, in which the one or more processors may be configured to control the apparatus to receive, from a base station (BS), configuration information including information on a reporting periodicity or a reporting time of measurement reporting, receive, from the BS, a reference signal (RS) based on the configuration information, perform measurement based on the reference signal, transmit, to the BS, information related to a beam change request based on a measurement value and a threshold value, and transmit the measurement information to the BS, and control the apparatus to transmit the information related to the beam change request before the reporting periodicity or the reporting time.

Advantageous Effects

According to an embodiment of the present disclosure, a beam change is requested even before a reporting period or a reporting time set for beam-related reporting by comparing a result of performing measurement based on a reference signal and a threshold, thereby reducing unnecessary measurement and reporting.

Further, according to an embodiment of the present disclosure, the beam change request is rapidly performed to improve delay and overhead increase.

Further, according to an embodiment of the present disclosure, a beam management operation is performed based on the configuration of the parameter "repetition" related to the reference signal resource and mapping of a resource element of a frequency domain to efficiently perform a beam management operation (e.g., P-1 operation).

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this disclosure illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 illustrates an example of beamforming using SSB and CSI-RS.

FIG. 8 is a flowchart for describing a downlink beam management procedure using SSB.

FIG. 9 is a diagram for describing a downlink beam management procedure using CSI-RS.

FIG. 10 is a diagram for describing a procedure for determining a reception beam in a downlink beam management procedure using CSI-RS.

FIG. 11 is a diagram for describing a procedure for determining a transmission beam in a downlink beam management procedure using CSI-RS.

FIG. 12 is a diagram for describing resource allocation in time and frequency domains in a downlink beam management procedure using CSI-RS.

FIG. 13 is a diagram for describing an uplink beam management procedure using SRS.

FIG. 14 is a flowchart for describing an uplink beam management procedure using SRS.

FIG. 15 is a flowchart illustrating an example of a CSI related procedure.

FIG. 16 illustrates an example of an operation sequence of a UE related to new beam setting reporting/request to which a method and/or an embodiment proposed in the present disclosure is applicable.

FIG. 17 illustrates an example of operation sequences of a BS and a UE to which a method and/or an embodiment proposed in the present disclosure is applicable.

FIG. 18 illustrates an example of performing a new beam setting reporting/request at every CSI-RS transmission periodicity to which a method and/or an embodiment proposed in the present disclosure is applicable.

FIG. 19 illustrates an example of an operation sequence of a UE which operates based on reporting candidates to which a method and/or an embodiment proposed in the present disclosure is applicable.

FIG. 20 illustrates an example of multiple candidates of a CSI reporting instance in which a UE requests another set of a beam(s) in a specific reporting instance and a BS changes a beam(s), to which a method and/or an embodiment proposed in the present disclosure is applicable.

FIG. 21 illustrates an example of an operation flowchart of a UE which perform beam-related reporting to which a method and/or an embodiment proposed in the present disclosure is applicable.

FIG. 22 illustrates an example for a configuration of a CSI-RS resource set and CSI-RS resources in which repetition "off" is configured for each panel.

FIG. 23 illustrates another example of operation sequences of a BS and a UE to which a method and/or an embodiment proposed in the present disclosure is applicable.

FIG. 24 illustrates a communication system (1) applied to the present disclosure.

FIG. 25 illustrates a wireless device which may be applied to the present disclosure.

FIG. 26 illustrates a signal processing circuit for a transmit signal.

FIG. 27 illustrates another example of a wireless device applied to the present disclosure.

FIG. 28 illustrates a portable device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes anew service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology, slots are numbered in increasing order of $N_s^\mu \in \{0, \ldots, N_{subframe}^{slots, \mu}-1\}$ within a subframe and are numbered in increasing order of $N_{s,f}^\mu \in \{0, \ldots, N_{frame}^{slots, \mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $N_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of $14 \cdot 2^\mu$ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^\mu-1$.

The resource element (k,l) for the numerology μ and the antenna port p corresponds to a complex value $a_{k,l}^{(p,\mu)}$. When there is no risk for confusion or when a specific antenna port or numerology is not specified, the indices p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where is No. Of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of abeam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using SSB and CSI-RS.

As illustrated in FIG. 7, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

1. DL BM Using SSB

FIG. 8 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S810).

Table 5 shows an example of CSI-ResourceConfig IE and as shown in Table 5, a BM configuration using the SSB is not separately defined and the SSB is configured like the CSI-RS resource.

TABLE 5

-- ASN1START
-- TAG-CSI-RESOURCECONFIG-START

TABLE 5-continued

```
CSI-ResourceConfig ::=        SEQUENCE {
  csi-ResourceConfigId        CSI-ResourceConfigId,
  csi-RS-ResourceSetList      CHOICE {
    nzp-CSI-RS-SSB            SEQUENCE {
      nzp-CSI-RS-ResourceSetList        SEQUENCE (SIZE
(1 . .maxNrofNZP-CSI-RS-ResourceSetsPerConfig)) OF NZP-CSI-RS-ResourceSetId
OPTIONAL,
      csi-SSB-ResoureeSetList           SEQUENCE (SIZE
(1 . .maxNrofCSI-SSB-ResourceSetsPerConfig)) OF CSI-SSB-ResourceSetIdOPTIONAL
    },
    csi-IM-ResouroeSetList   SEQUENCE (SIZE (1 . .maxNrofCSI-IM-
RessurseSetsPerConfig)) OF CSI-IM-ResoureSetId
  },
  bwp-Id                     BWP-Td,
  resourceType               ENUMERATED { aperiodicc, semiPersistent,
periodic },
    . . .
-- TAG-CSI-RESOURCECONFIGTOADDMOD-STOP
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S820).

When CSI-RS reportConfig associated with reporting of SSBRI and L1-RSRP is configured, the UE (beam) reports to the eNB best SSBRI and L1-RSRP corresponding thereto (S830).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

2. DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e. through FDM).

When the UE is a multi-panel UE, at least one CSI-RS resource is a target of FDM.

In addition, when the repetition is configured to "ON", it is related to the Rx beam sweeping procedure of the UE.

The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none', the UE may be configured only with the same number of port (1-port or 2-port) having higher layer parameter 'nrofPorts' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS_info is not configured in a specific CSI-RS resourceset, the CSI-RS is used for beam management.

In addition, if parameter repetition is not configured and TRS_info is configured, the CSI-RS is used as a TRS (Tracking Reference Signal).

In addition, if neither parameter repetition nor TRS_info is configured, the CSI-RS is used for CSI acquisition.

FIG. 9 illustrates an example of a downlink beam management procedure using a Channel State Information-Reference Signal (CSI-RS).

FIG. 9(a) illustrates an Rx beam determination (or refinement) procedure of the UE and FIG. 9(b) illustrates a Tx beam sweeping procedure of the eNB. Further, FIG. 9(a) illustrates a case where the repetition parameter is configured to 'ON' and FIG. 9(b) illustrates a case where the repetition parameter is configured to 'OFF'.

Referring to FIG. 9(a) and FIG. 10, an Rx beam determination process of the UE will be described.

FIG. 10 is a flowchart showing an example of a RX beam determination process of a UE in the DL BM procedure using CSI-RS.

In the FIG. 10, the UE receives, from the eNB, NZP CSI-RS resource set IE including higher layer parameter repetition through RRC signaling (S1010). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1020).

The UE determines the Rx beam thereof (S1030).

The UE may skip a CSI report and transmit a CSI report including CRI/L1-RSRP to the eNB (S1040).

In this case, reportQuantity of CSI report config may be configured as "No report (or None)" or CRI and L1-RSRP".

That is, when repetition is configured to "ON", the UE may skip the CSI report or report ID information (CRI) of a beam pair related priority beam and a quality value (L1-RSRP) thereof.

Referring to FIG. 9(b) and FIG. 11, a Tx beam determination process of the eNB will be described.

FIG. 11 is a flowchart showing an example of a TX beam determination process of an eNB.

The UE receives, from the eNB, NZP CSI-RS resource set IE including higher layer parameter repetition through RRC signaling (S1110).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1120).

The UE selects (or determines) a best beam (S1130), and reports to the eNB an ID for the selected beam and related quality information (e.g., L1-RSRP) (S1140).

In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 12 illustrates an example of resource allocation in time and frequency domains associated with an operation of FIG. 9.

Referring to FIG. 12, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

3. DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

-- ASN1START
-- TAG-TCI-STATE-START
TCI-State ::= SEQUENCE {
  tci-StateId      TCI-StateId, TABLE 6-continued

```
qcl-Type1        QCL-Info,
gcl-Type2        QCL-Info
...
}
QCL-Info ::=  SEQUENCE {
  cell              ServCellIndex
  bwp-id            BWP-Id
  referenceSignal   CHOICE {
    csi-rs          NZP-CSI-RS-ResourceId,
    ssb             SSB-Index
  },
  gcl-Type          ENUMERATED {typeA, typeB, typeC, typeD},
  ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

4. QCL (Quasi-Co Location)

An antenna port is defined so that a channel in which symbols on an antenna port are carried is inferred from a channel in which other symbols on the same antenna port are carried. If the property of a channel in which symbols on one antenna port are carried can be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and OCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K($\geq$1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 13 illustrates an example of an uplink beam management procedure using a Sounding Reference Signal (SRS).

FIG. 13(*a*) illustrates an Rx beam determination procedure of the eNB and FIG. 13(*b*) illustrates a Tx beam sweeping procedure of the UE.

FIG. 14 is a flowchart showing an example of an uplink beam management procedure using the SRS.

The UE receives, from the eNB, RRC signaling (e.g., SRS-Config IE) including a (higher layer parameter) usage parameter configured as 'beam management' (S1410).

Table 7 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 7

```
-- ASN1START
-- TAG-MAC-CELL-GROUP-CONFIG-START
SRS-Config : :=                SEQUENCE {
    srs-ResourceSetToReleaseList       SEQUENCE (SIZE(1 . .maxNrofSRS-
ResoureeSets) ) OF SRS-ResourceSetId OPTIONAL, -- Need N
    srs-ResourceSetToAddModList        SEQUENCE (SIZE(1. . maxNrofSRS-
ResourceSets) ) OF SRS-ResourceSet   OPTIONAL, -- Need N
    srs-ResourceToReleaseList          SEQUENCE (SIZE(1 . .maxNrofSRS-
Resources) ) OF SRS-ResourceId       OPTIONAL, -- Need N
    srs-ResourceToAddModList           SEQUENCE (SIZE(1 . .maxNrofSRS-
Resources) ) OF SRS-Resource         OPTIONAL, -- Need N
    tpc-Accumulation                   ENUMERATED {disabled}
    . . .
}
SES-ResourceSet : :=           SEQUENCE {
    srs-ResourceSetId              SRS-ResourceSetId,
    srs-ResourceIdList             SEQUENCE (SIZE(1 . .maxNrofSRS-
ResourcesPerSet)) OF SRS-ResourceId OPTIONAL, -- Cond Setup
    resourceType                CHOICE {
      aperiodic                    SEQUENCE {
        aperiodicSRS-ResourceTrigger          INTEGER
(1 . .maxNrofSRS-TriggerStates-1),
              csi-RS                      NZP-CSI-RS-ResourceId
              slotOffset                    INTEGER (1 . . 32)
              . . .
      },
      semi-persistent                SEQUENCE {
              associatedCSI-RS             NZP-CSI-RS-ResourceId
              . . .
      },
      periodic                     SEQUENCE {
              associatedCSI-RS             NZP-CSI-RS-ResourceId
              . . .
      }
    },
    usage                          ENUMERATED {beamManagement,
```

TABLE 7-continued

```
codebook, nonCodebook, antennaSwitching},
alpha                             Alpha
p0                                INTEGER (−202 . . 24)
patlossReferenceRS                CHOICE {
   ssb-Index                         SSB-Index,
   csi-RS-Index                      NZP-CSI-RS-ResourceId
SRS-SpatialRelationInfo : :=      SEQUENCE {
   servingCellId                     ServCellIndex
   referenceSignal                   CHOICE {
      ssb-Index                         SSB-Index,
      csi-RS-Index                      NZP-CSI-RS-ResourceId,
      srs                               SEQUENCE {
         resourceId                        SRS-ResourceId,
         uplinkBWP                         BWP-Id
      }
   }
}
SRS-ResourceId : :=               INTEGER (0 . . maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1420). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1430).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1440).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 13(a).

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 13(b).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Beam Failure Recovery (BFR) Procedure

In a Beamformed system, a Radio Link Failure (RLF) may often occur due to a UE's rotation, movement, or beam blockage. Accordingly, in order to prevent frequent occurrence of the RLF, RFR is supported in NR. The BFR may be similar to a radio link failure recovery procedure and supported when a UE knows a new candidate beam(s).

Prior to a description of the beam failure recovery procedure, (1) radio link monitoring and (2) link recovery procedures will be described first in brief.

1. Radio Link Monitoring

A DL radio link quality of a primary cell is monitored by a UE in order to indicate an out-of-sync or in-sync state to higher layers. The term "cell" used in the present disclosure may be a component carrier, a carrier, a BW, and the like. A UE does not need to a DL radio link quality in a DL BWP other than an active DL BWP on the primary cell.

The UE may be configured for each DL BWP of SpCell having a set of resource indexes through a set corresponding to (higher layer parameter) RadioLinkMonitoringRS for radio link monitoring by higher layer parameter failureDetectionResources.

Higher layer parameter RadioLinkMonitoringRS having a CSI-RS resource configuration index (csi-RS-Index) or an SS/PBCH block index(ssb-Index) is provided to the UE.

In the case where RadioLinkMonitoringRS is not provided to the UE and instead TCI-state for PDCCH including one or more RSs including one or more from a CSI-RS and/or an SS/PBCH block is provided to the UE, when active TCI-state for PDCCH include a single RS, the UE uses the RS, provided for the active TCI-state for PDCCH, for radio link monitoring.

when active TCI-state for PDCCH includes two RSs, the UE is not expected to have one RS has QCL-TypeD and use one RS for radio link monitoring. Hereinafter, the UE does not expect that both the two RSs has QCL-TypeD.

the UE does not use aperiodic RS for radio link monitoring.

The following Table 8 shows an example of RadioLinkMonitoringConfig IE.

The RadioLinkMonitoringConfig IE is used to configure radio link monitoring for detecting a beam failure and/or a cell radio link failure.

In Table 8, the parameter beamFailureDetectionTimer is a timer for beam failure detection.

The parameter beamFailureDetectionTimer indicates that the UE triggers a beam failure recovery after how many beam failure events.

Value n1 corresponds to 1 beam failure instance, and value n2 corresponds to 2 beam failure instances. If a network reconfigures a corresponding fields, the UE resets a counter related to on-goingbeamFailureDetectionTimer and beamFailureInstanceMaxCount.

If there is no corresponding field, the UE does not trigger a beam failure recovery.

Table. 9 shows an example of BeamFailureRecoveryConfig IE.

TABLE 8

```
-- ASN1START
-- TAG-RADIOLINKMONITORINGCONFIG-START
RadioLinkMonitoringConfig : :=    SEQUENCE {
  failureDetectionResoureesToAddModList      SEQUENCE
  (SIZE(1 . .maxNrofFailureDetectionResources))    OF RadioLinkMonitoringRS
      OPTIONAL,          -- Need N
  failureDetectionResourcesToReleaseList SEQUENCE
  (SIZE (1 . .maxNrofFailureDetectionResources)) OF RadioLinkMonitoringRS-
Id
      OPTIONAL, -- Need N
  beamFailureInstanceMaxCount            ENUMERATED {n1, n2, n3,
n4, n5, n6, n8, n10)                       OPTIONAL, -- Need S
  beamFailureDetectionTimer              ENUMERATED (pbfd1, pbfd2,
pbfd3, pbfd4, pbfd5, pbfd6, pbfd8, pbfd10}     OPTIONAL, -- Need R
  . . .
}
RadioLinkMonitoringRS : :=    SEQUENCE {
  radioLinkMonitoringRS-Id            RadioEinkMonitoringRS-Id,
  purpose                  ENUMERATED {beamFailure, rlf, both},
  detectionResource              CHOICE {
    ssb-Index                SSB Index,
    csi-RS-Index              NZP-CSI-RS-ResourceId
  },
  . . .
}
-- TAG-RADIOLINKMONITORINGCONFIG-STOP
-- ASN1STOP
```

For beam failure detection, the BeamFailureRecoveryConfig IE is used to configure the UE with RACH resources and candidate beams for beam failure recovery.

TABLE 9

```
-- ASN1START
-- TAG-BEAM-FAILURE-RECOVERY-CONFIG-START
BeamFailureRecoveryConfig : :=      SEQUENCE {
  rootSequenceindex-BFR            INTEGER (0 . .137)
  rach-ConfigBFR              RACH-ConfigGeneric
  rsrp-ThresholdSSB            RSRP-Range
  candidateBeamRSList            SEQUENCE
(SIZE(1 . .maxNrofCandidateBeams)) OF PRACH-ResourceDedicatedBFR
    OPTIONAL, -- Need M
  ssb-perRACH-Occasion            ENUMERATED (oneEighth, oneForth,
oneHalf, one, two, four, eight, sixteen)    OPTIONAL, -- Need M
  ra-ssb-OccasionMaskIndex          INTEGER (0 . .15)
  recoverySearchSpaceId            SearchSpaceId
  ra-Prioritization              RA-Prioritization
  beamFailureRecoveryTimer          ENUMERATED {ms10, ms20, ms40, ms60,
ms80, ms100, ms150, ms200}            OPTIONAL, -- Need M
  . . .
}
PRACH-ResourceDedicatedBFR : := CHOICE {
  ssb                  BFR-SSB-Resource,
  csi-RS                BFR-CSIRS-Resource
BFR-SSB-Resource : :=      SEQUENCE {
  ssb                  SSB-Index,
  ra-PreambleIndex              INTEGER (0 . . 63),
  . . .
```

TABLE 9-continued

```
}
BFR-CSIRS-Rosource : :=    SEQUENCE {
  csi-RS                   NZP-CSI-RS-ResourceId,
  ra-OccasionList              SEQUENCE (SIZE(1 . .maxRA-OccasionsPerCSIRS))
OF INTEGER (0 . .maxRA-Occasions-1)  OPTIONAL, -- Need R
  ra-PreambleIndex         INTEGER (0 . . 63)
  . . .
}
-- TAG-BEAM-FAILURE-RECOVERY-CONFIG-STOP
-- ASN1STOP
```

In Table 9, the parameter beamFailureRecoveryTimer is a parameter indicative of a timer for beam failure recovery, and a value of the parameter is set to ms.

The parameter candidateBeamRSList is a parameter indicative of a list of reference signals (CSI-RS and/or SSB) to identify random access (RA) parameters associated with candidate beams for recovery.

The parameter RecoverySearchSpaceId represents a search space used for BFR random access response (RAR).

If radio link quality is poorer than the threshold Qout for all resources in the set of resources for radio link monitoring, the physical layer of a UE indicates the out-of-sync status for a higher layer within a radio frame whose radio link quality was measured.

If the radio link quality for any resource in resource set for radio link monitoring is better than the threshold Qin, the physical layer of the UE indicates the in-sync status for a higher layer within a radio frame whose radio link quality was measured.

2. Link Recovery Procedure

A UE is provided, for a serving cell, with a set q0 of periodic CSI-RS resource configuration indexes by higher layer parameter failureDetectionResources, and a set q1 of periodic CSI-RS resource configuration indexes and/or SS/PBCH block indexes by candidateBeamRSList for measuring a radio link quality on the serving cell.

If the UE is not provided with higher layer parameter failureDetectionResources, the UE determines the set q0 to include SS/PBCH block indexes and periodic CSI-RS resource configuration indexes with same values as the RS indexes in the RS sets indicated by the TCI states for respective control resource sets that the UE uses for monitoring PDCCH.

If a threshold Qout_LR corresponds to the default value of higher layer parameter rlmInSyncOutOfSyncThreshold and to the value provided by higher layer parameter rsrp-ThresholdSSB, respectively.

The physical layer of the UE evaluates the radio link quality according to the set q0 of resource configurations against the threshold Qout_LR.

For the set q0, the UE assesses the radio link quality only according to periodic CSI-RS resource configurations or SS/PBCH blocks that are quasi co-located with the DM-RS of PDCCH receptions monitored by the UE.

The UE applies a Qin_LR threshold to a L1-RSRP measurement obtained from the SS/PBCH block.

The UE applies the Qin_LR threshold to the L1-RSRP measurement obtained for a CSI-RS resource after scaling a respective CSI-RS reception power with a value provided by higher layer parameter powerControlOffsetSS.

The physical layer in the UE provides an indication to higher layers when the radio link quality for all corresponding resource configurations in the set that the UE uses to assess the radio link quality is worse than the threshold Qout_LR.

The physical layer informs the higher layers when the radio link quality is worse than the threshold Qout_LR with a periodicity determined by the maximum between the shortest periodicity of periodic CSI-RS configurations or SS/PBCH blocks in the set q0 that the UE uses to assess the radio link quality and 2 msec.

Upon request from higher layers, the UE provides to the higher layers the periodic CSI-RS configuration indexes and/or SS/PBCH block indexes from the set q1 and the corresponding L1-RSRP measurements that are larger than or equal to the corresponding thresholds.

A UE may be provided with a control resource set through a link to a search space set provided by higher layer parameter recoverySearchSpaceId for monitoring PDCCH in the control resource set.

If the UE is provided higher layer parameter recoverySearchSpaceId, the UE does not expect to be provided another search space set for monitoring PDCCH in the control resource set associated with the search space set provided by recoverySearchSpaceId.

The aforementioned BFD and BFR procedure will be described again.

If beam failure is detected on a serving SSB or a CSI-RS(s), a BFR procedure used to indicate a new SSB or CSI-RS to a serving base station may be configured by RRC.

The RRC configures BeamFailureRecoveryConfig for a beam failure detection and recovery procedure.

The BFR procedure may include (1) a step of beam failure detection, (2) a step of new beam indication, a step of Beam Failure Recovery Request (RFRQ), and (4) a step of monitoring a response to the BFRQ from a base station.

Hereinafter, for the step (3), that is, for transmission of the BFRQ, a PRACH preamble or a PUCCH may be used.

The step (1), that is, beam failure detection will be described in more detail.

When block error rates (BLERs) of all serving beams are a threshold or more, it is called a beam failure instance (BFI).

RSs to be monitored by a UE may be explicitly configured by RRC or are implicitly determined by a beam RS for a control channel.

An indication of the beam failure instance to higher layer is periodic, and an indication interval is determined by the shortest periodicity of BFD RS set.

If an evaluation is lower than a beam failure instance BLER threshold, there is no indication to higher layer.

When N number of consecutive beam failure instances has occurred, a beam failure is declared.

Hereinafter, N is the parameter NrofBeamFailureInstance which is configured by RRC.

1-port CSI-RS and SSB are supported for a BFD RS set.

Next, the step (2), that is, new beam indication will be described.

A network NW may transmit configuration of one or multiple PRACH resources/sequences to a UE.

A PRACH sequence is mapped to at least one new candidate beam.

The UE selects anew beam from among candidate beams having L1-RSRP equal to or greater than a threshold configured by RRC, and transmits a PRACH via the selected beam. In this case, which beam the UE selects may be an UE implementation issue.

Next, the steps (3) and (4), that is, transmitting a BFRQ and monitoring a response to the BRFQ will be described.

A dedicated CORESET may be configured by RRC to monitor time duration of a window and the response to the BFRQ from the base station.

The UE starts to monitor the response after 4 slots of PRACH transmission.

The UE assumes that the dedicated CORESET is spatial QCL with a DL RS of a UE-identified candidate beam in the beam failure recovery request.

If the timer expires or when the number of PRACH transmission reaches the maximum number, the UE stops the BFR procedure.

Hereinafter, the maximum number of PRACH transmissions and the timer are configured by RRC.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition and L1-RSRP computation is related to beam management (BM).

Channel state information (CSI) collectively refers to information that may indicate the quality of a wireless channel (or referred to as a link) formed between the UE and the antenna port.

FIG. 15 is a flowchart showing an example of a CSI associated procedure to which a method proposed in the present disclosure may be applied.

Referring to FIG. 15, in order to perform one of usages of the CSI-RS, a terminal (e.g., user equipment (UE)) receives, from a base station (e.g., general Node B or gNB), configuration information related to the CSI through radio resource control (RRC) signaling (S1510).

The configuration information related to the CSI may include at least one of CSI-interference management (IM) resource related information, CSI measurement configuration related information, CSI resource configuration related information, CSI-RS resource related information, or CSI reporting configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 10 shows an example of NZP CSI-RS resource set IE. As shown in Table 10, parameters (e.g., a BM related "repetition" parameter and a tracking related "trs-Info" parameter) representing the usage may be configured for each NZP CSI-RS resource set.

TABLE 10

```
-- ASN1START
-- TAG-NZP-CSI-RS-RESOURCESET-START
NZP-CSI-RS-ResourceSet : := SEQUENCE {
   nzp-CSI-ResourceSetId      NZP-CSI-RS-ResourceSetId,
   nzp-CSI-RS-Resources       SEQUENCE (SIZE (1. .maxNrofNZP-
CSI-RS-ResourcesPerSet)) OF NZP-CSI-RS-ResourceId,
   repetition                 ENUMERATED ( on, off )
   aperiodicTriggeringOffset  INTEGER(0 . . 4)
   trs-Info                   ENUMERATED (true)
   . . .
}
-- TAG-NZP-CSI-RE-RESOURCESET-STOP
-- ASN1STOP
```

In addition, the repetition parameter corresponding to the higher layer parameter corresponds to "CSI-RS-ResourceRep" of L1 parameter.

The CSI reporting configuration related information includes a reportConfigType parameter representing a time domain behavior and a reportQuantity parameter representing a CSI related quantity for reporting. The time domain behavior may be periodic, aperiodic, or semi-persistent.

The CSI reporting configuration related information may be expressed as CSI-ReportConfig IE and Table 11 below shows an example of CSI-ReportConfig IE.

TABLE 11

```
-- ASN1START
-- TAG-CSI-RESOURCECONFIG-START
CSI-ReportConfig : :=                    SEQUENCE {
   reportConfigId                        CSI-ReportConfig Id,
   carrier                               ServCellIndex          OPTIONAL, -
- Need S
   resourcesForChannelMeasurement        CSI-ResourceConfigId,
   csi-IM-ResourcesForInterference       CSI-ResourceConfigId   OPTIONAL, -
- Need R
   nzp-CSI-RS-ResourcesForInterference   CSI-ResourceConfigId   OPTIONAL, -
- Need R
   reportConfigType                      CHOICE {
      periodic                           SEQUENCE {
         reportSlotConfig                CSI-
ReportPeriodicityAndOffset,
         pucch-CSI-ResourceList          SEQUENCE (SIZE
(1 . .maxNrofBWPs) ) OF PUCCH-CSI-Resource
```

TABLE 11-continued

```
    },
    semiPersistentOnPUCCH           SEQUENCE {
      reportSlotConfig                CSI-
ReportPeriodicityAndOffset,
      pucch-CSI-ResourceList          SEQUENCE (SIZE
(1 . .maxNrofBWPs) ) OF PUCCH-CSI-Resource
    },
    semiPersistentOnPUSCH           SEQUENCE {
      reportSlotConfig                ENUMERATED (s15, s110, s120,
s140, s180, s1160, s1320},
      reportSlotOffsetList            SEQUENCE (SIZE (1 . . maxNrofUL-
Allocations)) OF INTEGER(0 . . 32),
      p0alpha                         P0-PUSCH-AlphaSetId
    },
    aperiodic                       SEQUENCE {
      reportSlotOffsetList            SEQUENCE (SIZE (1 . .maxNrofUL-
Allocations) ) OF INTEGER(0 . . 32)
    }
  },
  reportQuantity                  CHOICE {
    none                            NULL,
    cri-RI-PMI-CQI                  NULL,
    cri-RI-i1                       NULL,
    cri-RI-i1-CQI                   SEQUENCE {
      pdsch-BundleSizeForCSI          ENUMERATED {n2, n4}
OPTIONAL
    },
    cri-RI-CQI                      NULL,
    cri-RSRP                        NULL,
    ssb-Index-RSRP                  NULL,
    cri-RI-LI-PMI-CQI               NULL
  },
```

The UE measures CSI based on configuration information related to the CSI (S1520). The CSI measurement may include (1) a CSI-RS reception process (S1521) and (2) a process of computing the CSI through the received CSI-RS (S1522). And, detailed descriptions thereof will be described later.

For the CSI-RS, resource element (RE) mapping is configured time and frequency domains by higher layer parameter CSI-RS-ResourceMapping.

Table 12 shows an example of CSI-RS-ResourceMapping IE.

In Table 12, a density (D) represents a density of the CSI-RS resource measured in RE/port/physical resource block (PRB) and nrofPorts represents the number of antenna ports.

The UE reports the measured CSI to the eNB (S1530).

Here, in the case where a quantity of CSI-ReportConfig of Table 12 is configured to "none (or No report)", the UE may skip the report.

However, even in the case where the quantity is configured to "none (or No report)", the UE may report the measured CSI to the eNB.

TABLE 12

```
-- ASN1START
-- TAG-CSI-RS-RESOURCEMAPPING--START
CSI-RS-ResourceMapping : :=     SEQUENCE {
  frequencyDomainAllocation       CHOICE {
    row1                            BIT STRING (SIZE (4)),
    row2                            BIT STRING (SIZE (12)),
    row4                            BIT STRING (SIZE (3)),
    other                           BIT STRING (SIZE (6))
  },
  nrofPorts                       ENUMERATED {p1,p2,p4,p8,p12,p16,p24,p32},
  firstOFDMSymbolInTimeDomain     INTEGER (0 . . 13),
  firstOFDMSymbolInTimeDomain2    INTEGER (2 . . 12)
  cdm-Type                        ENUMERATED {noCDM, fd-CDM2, cdm4-FD2-TD2, cdm8-
FD2-TD4},
  density                         CHOICE {
    dot5                            ENUMERATED (evenPRBs, oddPRBs},
    one                             NULL,
    three                           NULL,
    spare                           NULL
  },
  freqBand                        CSI-FrequencyOccupation,
  . . .
}
```

The case where the quantity is configured to "none (or No report)" is a case of triggering aperiodic TRS or a case where repetition is configured.

Here, only in a case where the repetition is configured to "ON", the UE may be skip the report.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting "CSI-ResourceConfig" includes a configuration for S≥1 CSI resource set (given by higher layer parameter csi-RS-ResourceSetList). Here, the CSI resource setting corresponds to the CSI-RS-resource-setlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to "1" with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are "QCL-TypeD" for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured through RRC and refer to the CSI-ReportConfig IE.

ii) SP CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. SP CSI reporting has activation/deactivation which is the same as or similar to a mechanism having data transmission on SPS PUSCH.

iii) aperiodic CSI reporting is performed on a PUSCH and triggered by DCI. In this case, information related to trigger of aperiodic CSI reporting may be transferred/instructed/configured through MAC-CE.

In the case of AP CSI having an AP CSI-RS, AP CSI-RS timing is set by RRC, and timing for AP CSI reporting is dynamically controlled by DCI.

The NR does not adopt a scheme (for example, transmitting RI, WB PMI/CQI, and SB PMI/CQI in order) of dividing and reporting the CSI in multiple reporting instances applied to PUCCH-based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. And, Z' represents a minimum CSI processing time from the reception of the CSI-RS for channel/interference to the execution of the CSI reporting.

Additionally, the UE reports the number of CSIs which may be simultaneously calculated.

The contents (e.g., 3GPP system, frame structure, CSI-related operation, beam-related operation, etc.) described above may be applied in combination with methods proposed in the present disclosure or may be supplemented to clarify technical features of the methods proposed in the present disclosure.

In the present disclosure, '/' may mean that all of the contents distinguished by/are included (and) or only some of the distinguished contents are included (or). Further, in the present disclosure, the following terms are unified and used.

Abbreviation & Definition

ACK: Acknowledgement
NACK: Negative Acknowledgement
CA: Carrier aggregation
DCI: Downlink Control format Indicator/index
MAC-CE: Multiple Access Channel Control Elements
BWP: Bandwidth part
RF: Radio frequency
CC: Component carrier
SS: Synchronization Signals
SSB: Synchronization signal block—regarded as being the same as SS/PBCH block in the present disclosure.
SSBRI: SSB resource index/indicator
IM: Interference measurement
FDM: Frequency division multiplexing
TDM: Time division multiplexing
RS: Reference Signal(s)
CSI-RS or CSIRS: Channel State Information Reference Signals
CSI-IM: Channel State Information Interference Measurement
CRI: CSI-RS resource index/indicator
DM-RS or DMRS: Demodulation Reference Signals
MAC: Medium Access Control MAC-CE: Medium Access Control Channel Element
NZP: Non Zero Power
ZP: Zero power
PT-RS or PTRS: Phase Tracking Reference Signals
SRS: Sounding Reference Signals
SRI: SRS resource index/indicator
PRS: Positioning Reference Signals
PRI PRS resource index/indicator
OFDM: Orthogonal Frequency Division Multiplexing
TX: Transmission
TP: Transmission Point
BS: Base station (The base station may be replaced with a term such as TP/TRP/gNB/eNB.)
RX: Reception
RRC: Radio Resource Control
RSRP: Reference Signal Received Power
RSRQ: Reference Signal Received Quality
SNR: Signal to Noise Ratio
SINR: Signal to Interference plus Noise Ratio
URLLC: Ultra Reliable Low Latency Communication
PUSCH: Physical Uplink Shared Channels
PUCCH: Physical Uplink Control Channels
PDCCH: Physical Downlink Control Channels
PDSCH: Physical Downlink Shared Channels
ID: Identity (or means identity/identification number)
UL: Uplink
DL: Downlink
UE: User equipment (means the terminal)

The BS may configure/indicate, to the UE, measurement execution such as L1/L3-RSRP/RSRQ/SINR for a reference signal(s) (e.g., CSI-RS/SRS/SSB) in which a time-domain behavior is configured to be "periodic" or "semi-persistent". Further, periodic/semi-persistent CSI reporting is configured with a longer periodicity than a transmission periodicity of the reference signal(s) (e.g., CSI-RS/SRS/SSB) to configure/indicate the UE to report M (>0) TX beam(s) information to a specific BS. For example, the transmission periodicity of the reference signal(s) (e.g., CSI-RS/SRS/SSB) may be set to X (>0) and the CSI reporting periodicity may be set to Y (>X). When the BS indicates to report M transmission TX beam(s) information to the UE, various CSI reporting criteria may be considered.

For example, the UE may be indicated/configured to report M RS resources (e.g., CSI-RS resource, SRS resource, SSB resource, etc.) having a largest measurement value (e.g., RSRP/RSRQ/SINR) indexes among all RS resource(s) or resource set(s) configured to the UE. Alternatively, the UE may be configured/indicated to report RX index(es) corresponding to multiple beams which exceed a specific RSRP threshold value.

When the RS transmission periodicity is shorter than the CSI reporting periodicity, even though all measurement values of RSRP/RSRQ/SINR for a DL TX beam(s) shown to the UE for selection/configuration of the transmission TX beam(s) of the BS have low values, the UE should continuously perform measurement and average measurement computation of RSRP/RSRQ/SINR for CSI reporting (e.g., M (>0) best (hereinafter, expressed as M-best) CRI(s)) indicated from the BS. However, even though the UE reports RSRP(s)/RSRQ(s)/SINR(s) for M-best beam(s) and RS resource index information therefor, an RSRP/RSRQ/SINR measurement value for the M-best beam is too low, and as a result, the transmission TX beam to be used by the BS may not be selected/determined and a process of finding a BS transmission TX beam(s) will be repeated again. That is, the BS may configure other TX beam(s) other than N TX beam(s) which is previously configured/transmitted and may have to repeatedly perform a process of finding the TX beam through a TX beam sweeping operation.

Consequently, until the UE may unnecessarily perform CSI measurement until showing another set of the TX beam(s) to the UE based on DL TX beam(s) information reported from the UE and finally finds an appropriate DL TX beam(s), a time delay (latency) and overhead may unnecessarily increase.

The present disclosure proposes the following operations of the BS and the UE by a method for solving the above-described problem (time delay and overhead increase problem).

<Method 1>

The UE may request a change of some or all of downlink TX beam(s) of the BS/TP(s) based on a size of each of measurements (e.g., RSRP/RSRQ/SINR, etc.) measured up to a specific time or an average value of measurement values (e.g., RSRP/RSRQ/SINR, etc.) measured up to a specific time by using an RS resource(s) and/or RS resource set(s) configured from the BS. Here, the measurement value may be CSI for beam reporting. A signaling (e.g., new beam setting request/reporting) of the UE therefor may use a time-frequency resource preconfigured from the BS or may be performed without approval of the BS (grant-free). Unnecessary delay and/or overhead may be reduced through the operations of the UE and the BS.

For example, in order to configure/select/determine M (M>0) TX beams and/or RX beams of the UE, the BS may configure N (N>M) RS resource(s) and/or RS resource set(s) to the UE. As reporting setting associated with the configured RS resource(s) and/or RS resource set(s), the BS may configure to the UE to report RS index(es) corresponding to M best RSRPs (hereinafter, expressed as M-best RSRP(s)) or M best RSRQs (hereinafter, expressed as M-best RSRQ(s)) or M best SINRs (hereinafter, expressed as M-best SINR(s)) and/or RX index(es) and an RSRP(s)/RSRQ(s)/SINR(s) value (e.g., M best CRI(s)/SSBRI(s) (hereinafter, expressed as M-best CRI(s)/SSBRI(s)). It is assumed that a time domain behavior of the configured RS resource(s) is configured to be 'periodic (P)' or 'semi-persistent (SP)', and the periodicity is X (X>0). Further, it is assumed that the configured reporting periodicity is Y and Y>X is assumed.

For example, in the case of Y=TX, according to the legacy scheme, the UE performs a total of T measurements (e.g., RSRP, RSRQ, SINR, etc.) for N configured RS resource(s) up to a reporting time of M best RS indexes (hereinafter, expressed M-best RS index(es)). An average value may be acquired with a total of T measurement samples for each RS resource, a measurement(s) value acquired through each RS resource or resource set may be defined/determined with the average value of the measurements, and the measurement value may be considered for reporting the RX index(es). Based thereon, the UE may select M best (hereinafter, referred to as M-best) measurement value(s) and/or RX index(es) and report the selected measurement value(s) and/or RS index(es) to the BS.

However, for example, in a first RS transmission periodicity, as a result of acquiring a measurement value(s) for N RS resources by the UE, the all acquired measurement value(s) may be smaller than a specific threshold value (e.g., the minimum required level of RSRP/RSRQ/SINR/SNR, etc.). Here, the first RS transmission periodicity is just one example for description, and does not limit a technical scope of the present disclosure and may correspond to an RS transmission periodicity before a CSI reporting periodicity. That is, all of strengths/qualities of the DL TX beam(s)

shown through the RS resources configured by the BS may not be good. In this case, the UE needs to request the BS to configure different DL TX beam(s) in some or all RS resource(s) and/or RS resource set(s).

In the present disclosure, an operation of requesting the configuration for anew beam is referred to as a "new-beam-setting reporting/request". The expression is just an example for convenience of description, and does not limit the technical scope of the present disclosure.

The UE may assume that the RS resource(s) and/or RS resource set(s) transmitted after the new beam setting reporting/request is transmitted through different DL TX beam(s) and exclude/ignore a measurement value (e.g., RSRP/RSRQ/SINR, etc.) measured up to now. That is, when the UE determines M-best RX index(es) and/or RS resource set index(es), and reports the determined RX index(es) and/or RS resource set index(es), the UE may exclude the RX index(es) and/or RS resource set index(es) from a sample of an RSRP measurement(s) value acquired by taking a long-term or short-term average for the RSRP value. Further, after the new beam setting reporting/request, the UE may exclude/ignore a measurement value acquired by using the RS resource(s) and/or RS resource set(s) for measurement of an interference channel, and the BS may indicate/configure the operation of the UE. Since the BS may also adjust the TX beam of an adjacent cell of the UE/the BS based on the new beam setting reporting/request of the UE, the operation of the UE may be required.

In particular, since periodically showing a transmission beam(s) not suitable for multiple UE(s) may cause significant radio resource waste, periodically showing the transmission beam(s) may be further important when the BS performs TX beam sweeping simultaneously to multiple UE(s) (cell-specific and/or UE-group specific) in a specific symbol(s)/slot(s). By considering that the CSI-RS may be configured/transmitted to be UE-group specific, the new beam setting reporting/request and the resulting RSRP averaging adjustment may be required.

As another example, the RSRP value (e.g., M-best RSRP(s) value) is maintained to a predetermined level or more up to a T−2-th RS resource(s) transmission time, but an RSRP value (e.g., M-best RSRP(s)) measured in a T−1-th RS resource(s) transmission periodicity may be significantly low (may be less than a threshold value) due to mobility of the UE or a change of a fading channel environment. In this case, the UE may request the BS to change the DL TX beam(s) at the time of transmitting a T-th RS resource(s) (the UE may transmit the new beam setting reporting/request to the BS). The UE may ignore the RSRP measurement value for the T−1-th transmitted RS resource(s), and report, to the BS, the RX index(es) and/or RS index(es) and RSRP(s) value corresponding to M-best RSRP(s) based on the RSRP measurement value for the T-th transmitted RS resource(s).

The UE may perform the new beam setting reporting/request based on an average of RSRP values measured up to the present time (i.e., measured over multiple periodicities) or perform the new beam setting reporting/request based on only an RSRP value acquired at a specific time (transmission periodicity). Here, suitability for whether the new beam setting reporting/request is based on the average RSRP value or an instantaneous RSRP value may vary depending on the mobility of the UE or a channel environmental change around the UE. The BS may configure/indicate, to the UE, the criterion for performing the beam setting reporting/request and one of the two criteria may be defined/configured/indicated to the UE as one default operation even though there is no separate indication/configuration of the BS.

When the UE requests the new beam setting reporting/request to the BS, the UE may consider the interference channel. The new beam setting reporting/request may be extensively applied when requesting the change of the TX beam(s) of the BS, which causes interference to the UE. In other words, the UE may request to change TP/BS beam(s) which causes interference of a neighbor cell rather than the TP/BS beam(s) of the serving cell. For example, when a measurement value (e.g., interference signal power, RSRP, etc.) acquired by using RS resource(s) and/or RS resource set(s) (e.g., CSI-IM resource(s)/resource set(S), NZP CSI-RS resource(s)/resource set(s) for interference measurement, and ZP CSI-RS resource(s)/resource set(s)) for interference measurement configured from the BS exceeds a specific threshold value, the UE may request the BS to change the TX beam of the adjacent cell/BS/TP configured/transmitted to the specific resource(s) or all resource(s). The specific threshold value as an allowance level for the interference signal power received by the UE may be configured/indicated to the UE by the BS.

The above-described method may be particularly required in a narrow-beam based NR system. For example, even though an RSRP value for a specific UE (for the TP/BS of a desired cell) is significantly large, the RSRP value may be significantly low if the interference of the adjacent cell/BS is considered. In particular, when a TX beam direction of one or two adjacent cells/BSs/TPs which are most adjacent is directed to a UE which receives an interference influence, if only a TX beam direction which causes the interference is changed, the UE may secure a sufficiently high level of SINR.

As a specific example, it may be assumed that the specific UE periodically measures interference power for the TX beam(s) of the adjacent cell/BS with the CSI-IM resource(s). The adjacent cell/BS may consider transmitting data to each UE(s) with an appropriate TX beam while changing the DL TX beam(s) according to the time in order to support a subscribed/serving UE(s) thereof. The UE may periodically measure the interference signal power received from the TX beam(s) of the adjacent cell/BS, and when it is determined that the interference signal power is excessively large at a specific periodicity and it is thus difficult to receive data from the serving cell/BS, the UE may report/request the change of the TX beam(s) of the adjacent cell/BS to (a centralized scheduling or serving cell) BS.

In the present disclosure the new beam setting reporting/request of the UE described above may be defined as follows.

UE operation of transmitting, to BS, signal for requesting transmission/configuration of new DL TX beam(s) different from DL TX beam(s) currently configured/transmitted in current configured RS resource(s) and/or RS resource set(s).

UE operation of transmitting, to BS, signal for requesting transmission/configuration of new DL TX beam(s) different from DL TX beam(s) currently configured/transmitted in one or some RS resource(s) among N RS resource(s) currently configured.

UE operation of transmitting, to BS, signal for requesting configuration of separate RS resource(s) and/or RS resource set(s) other than RS resource(s) and/or RS resource set(s) currently configured.

In addition, not only the change request for the DL TX beam(s) mentioned above, but discarding the measurement value (e.g., RSRP/RSRQ/SINR, etc.) previously acquired by the UE after the change request may also be included in the new beam setting reporting/request operation and defined/configured/indicated.

UE operation of transmitting, to BS, a request of transmission/configuration of new DL TX beam(s) different from legacy/currently configured/transmitted TX beam(s) of adjacent cell/BS/TP in some or all RS resource(s) and/or RS resource set(s) configured for interference channel measurement.

The operation of the UE which performs the new beam setting reporting/request to the BS may be (changed to) interpreted as a meaning of notifying the BS of occurrence of a specific event (e.g., a situation in which a preconfigured of a beam and/or a quality of a beam which the UE currently measures/recognizes is lower than a specific threshold value). Further, a method for notifying the BS of the occurrence of the event may use a resource which the BS configures to the UE and may be performed by a grant-free scheme.

The above-described new beam setting reporting/request may be performed for each specific TP/BS/TX panel. In particular, when the new beam setting reporting/request is performed for each TX panel, a situation in which a specific RS resource set is interlocked, and configured/mapped for each TX panel may be assumed. That is, a situation may be assumed in which the UE is configured with multiple RS resource sets, and the UE may request the BS to change the DL TX beam(s) only for one or more specific RS resource set(s) among the configured RS resource sets.

Further, the above-described beam setting reporting/request may be configured/defined in the grant-free scheme, but as a kind of aperiodic CSI reporting, a new field (e.g., "new-beam-setting") may be defined as a report quantity, and configured/indicated to the UE so as to mean anew DL TX beam setting request. However, in this case, it may be necessary that an operation of the UE which processes previously acquired measurement of the UE is also defined together.

FIG. 16 illustrates an example of an operation sequence of a UE related to new beam setting reporting/request to which a method proposed in the present disclosure is applicable. FIG. 16 is just one example for convenience of the description and does not limit a technical scope of the present disclosure. Hereinafter, FIG. 16 will be described in detail with reference to the above-described proposal method and FIG. 16.

A UE may receive configuration information from a BS (the BS may transmit the configuration information to the UE) (S1610). For example, the configuration information may include configuration information related to a reference signal, reporting setting information related to CSI for beam reporting, etc.

The UE may receive information related to a threshold value from the BS. The information related to the threshold value may be used to compare with a measurement value (e.g., RSRP/RSRQ/SINR, etc.) measured based on the reference signal by the UE. The measurement value may be CSI for beam reporting. The information related to the threshold value may include a threshold value itself. As an example, the information related to the threshold value may include a threshold value such as RSRP/RSRQ/SINR, etc. The BS may configure/indicate the threshold value through signaling such as RRC/MAC-CE/DCI, etc. When the BS does not configure/indicate the threshold value, the UE may recognize/consider a specific value as the threshold value as a default.

For example, an average value of upper Y (>0)% among RSRP values for a serving cell beam(s) measured in an initial access and/or legacy beam management step may be used as the threshold value as a default value. Here, the BS may configure/indicate the Y value to the UE. Alternatively, the Y value may be pre-defined between the BS and the UE.

As another example, multiple values may be configured as candidates of the threshold value through RRC signaling, and at least one value of the candidate values may be dynamically configured/indicated through MAC-CE and/or DCI signaling. The need of such technical properties is as follows. When considering that there are multiple TP(s) in a single cell, the threshold value needs to be configured/indicated differently according to a distance between a TP(s) and the UE. Further, the threshold value needs to be configured differently according to the distance between the BS and the UE in order to configure an appropriate TX-RX beam between an adjacent cell(s) other than a serving cell, and the TP(s) for a purpose of NR positioning, etc. Accordingly, the threshold value may be configured/indicated for each cell or TP. Alternatively, when it is considered that a specific RS resource set is configured to one TP/cell, the specific threshold value may be defined/configured for each specific RS resource set/group, and interlocked with the specific RS resource set/group, and configured/indicated.

The UE may receive the reference signal based on the configuration information and perform measurement based on the reference signal (S1630).

The UE may determine whether to request new beam setting, i.e., whether to perform new beam setting request/reporting, based on the information related to the threshold value and the measurement value. The UE may report/request the new beam setting.

A reporting/request triggering condition/criterion may be defined in which the UE reports/requests the new beam setting. Specifically, it may defined that when RSRP measurement values of how many RS resource(s) among a configured total of N (>0) RS resource(s) are smaller than a specific threshold value, the UE may request the BS to set a new DL TX beam(s).

The present disclosure proposes interlocking the above-described new beam setting reporting/request with reporting setting and/or report quantity of a CSI framework configured/indicated from the BS, and configuring/indicating the new beam setting reporting/request. For example, when the UE is configured/indicated from the BS so as to report M-best RSRP and/or M-best RSRP and RS index(es) (or RS set index(es)), the following may be considered as a triggering condition for the new beam setting reporting/request of the UE at a time before reporting the M-best RSRP and/or M-best RSRP and RS index(es).

For example, when the same condition as the following examples is satisfied, the BS may configure/indicate the UE to report a signal for requesting new beam setting. Alternatively, when the new beam setting reporting/request is configured/indicated as aperiodic CSI reporting, the UE may report the BS to know whether to satisfy the same condition as the following examples. As an example, when the condition is satisfied, "1" is reported and when the condition is not satisfied, "0" is reported, and as a result, the BS may recognize whether the UE reports/requests the new beam setting.

Case where among RSRP measurement values acquired through a total of N RS resources, an RSRP value which exceeds a specific threshold value is smaller than M (e.g., case where among RSRP measurement values acquired through N RS resources, largest M−1 RSRP measurement values exceed a specific threshold value and the remaining RSRP measurement values are smaller than the specific threshold value may be considered).

Case where among the RSRP measurement values acquired through a total of N RS resources, N−M+1 RSRP(s) values are smaller than a specific threshold value.

Case where among the RSRP measurement values acquired through a total of N RS resources, one or more RSRP(s) values are smaller than a specific threshold value.

Case where among the RSRP measurement values acquired through a total of N RS resources, all RSRP(s) values are smaller than a specific threshold value.

Case where among the RSRP measurement values acquired through a total of N RS resources, RSRP(s) values of X % (0<X<1) or more are smaller than a specific threshold value.

As another example, a situation may be considered, in which the UE receives a configuration/indication such as "no-report" as a report quantity configured in association with RS resource(s) and/or RS resource set(s) configured not to report even any channel information from the BS. Such a configuration may be regarded as a process in which the UE finds an appropriate reception RX beam of the UE while changing the reception RX beam for a DL TX beam of a specific TP/BS. The BS may periodically perform the configuration in order to correct/adjust the RX beam of the UE, and in this case, when a DL TX beam direction of the BS is significantly different from a location of the UE, it may be difficult to find the RX beam to acquire the RSRP value which exceeds a specific threshold value even though the UE adjusts the RX beam in any direction.

Accordingly, even in a case where the report quantity is configured/indicated to the UE as "no-report", the UE may be required to request the BS to set the DL TX beam(s). As with a case where the report quantity is configured as M-best CRI(s), in the case of a periodic/semi-persistent CSI report (e.g., "no-report") configured by interlocking with periodically/semi-persistently configured RS resource(s) transmission, such an attribute may be very important in terms of reduction of the delay and the overhead.

Further, the new beam setting reporting/request of the UE may be used for a P1 operation (e.g., beam management operation for DL TX-RX beam correspondence) of finding the best TX beam of the TP/BS and the best RX beam of the UE in association with/by interlocking with "no-report" setting which is one of report quantity settings. For example, the UE may be configured with N periodic/semi-persistent RS resource(s) repeatedly transmitted at a periodicity of T (>0) slot(s)/ms and configured with "no-report" as the report quantity by interlocking with the configured periodic/semi-persistent RS resource(s). For N RS resources transmitted at a first periodicity, the UE may measure the RSRP while sweeping the RX beam, and among the measured RSRPs, M (>0)-best RSRP is lower than a specific threshold value, and as a result, the UE may request to change a currently configured TX beam(s). The BS may show a changed BS TX beam(s) to the UE from a next RS resource transmission periodicity, and even though the UE receives the "no-report" setting, the UE reports "new-beam-setting" to sufficiently assume that the BS will change the DL TX beam(s). An operation of measuring the RSRP(s) is repeated while changing the reception RX beam(s) together with the assumption, and as a result, an operation of finding transmission/reception beam(s) for guaranteeing a strength/quality of a predetermined level or more may be performed.

When the UE requests the BS to set/transmit the new DL TX beam(s) with a scheduling request (SR), etc., it is necessary to consider how the UE is to process the measurement value (e.g., RSRP, RSRQ, SINR, etc.) previously acquired through the configured RS resource(s) and/or RS resource set(s).

Since the UE requests setting the new DL TX beam(s), the UE may assume/regard that a measurement value measured from a next RS resource(s) transmission periodicity is the same RS resource(s), but the DL TX beam(s) of the BS is different. When the UE reports/requests new beam setting, the UE may discard (initialize) the previously acquired measurement value (S1660). Here, an expression of discarding the measurement value may be replaced with an expression such as initializing, excluding, ignoring, etc., and may be appreciated as a meaning that the corresponding value is not used when calculating the CSI for beam reporting to be reported to the BS.

For example, the UE may ignore/exclude the measurement value (e.g., RSRP, RSRQ, SINR, etc.) acquired before the new beam setting reporting/request time. In other words, ignoring/excluding the measurement values (e.g., RSRP, RSRQ, and SINR) may be interpreted as excluding the measurement values in the process of calculating/determining an average value of measurement values acquired over multiple periodicities in order to report the RS index(es) and/or RS index(es) and measurement values (e.g., RSRP, RSRQ, and SINR).

As a specific example, the UE may not reflect (or may ignore) an RSRP value acquired before +k (>0) (or −k) time units (e.g., symbol(s), slot(s), or millisecond(s)) based on the time of reporting/requesting the new beam setting on RSRP calculation (e.g., average RSRP) for CSI reporting (e.g., M-best CRI(s)). And/or the BS may configure/indicate the operation of the UE. The k value may be configured/indicated by the BS or may be defined as a default value even though the k value is separately configured/indicated by the BS.

As another specific example, after +k (or −k) time units (e.g., symbol(s), slot(s), or milliseconds) based on a time of transmitting, to the UE, a signal (e.g., acknowledgement, etc.) meaning that the BS grants the new beam setting reporting/request, the UE may discard the previously acquired/measured measurement value. The BS may configure/indicate the operation of the UE, and the UE may perform the operation as a default operation even though there is no separate configuration/indication of the BS.

As yet another specific example, the operation of the UE needs to be defined by considering a time interval between the new beam setting reporting/request of the UE and an RS transmission time (of a next periodicity). The BS may configure/indicate, to the UE, a minimally required value (e.g., Y, Y>0 symbol(s), slot(s), or milliseconds) up to setting the new DL TX beam at the time of transmitting the RS after the new beam setting reporting/request of the UE. When the UE reports/requests the new beam setting before Y (symbol(s), slot(s), or milliseconds) based on a next RS reception time, the UE may discard the measurement value such as RSRP/RSRQ/SINR for the RS resource(s) transmitted up to the present time. On the contrary, if the UE reports/requests the new beam setting before the next RS reception time, but does not report/request the new beam setting before Y (symbol(s), slot(s), or milliseconds) based on the RS reception time, the UE may discard the measurement value(s) such as RSRP/RSRQ/SINR acquired while receiving the next RS, which includes the measurement value acquired up to the present time. The BS may configure/indicate the operation of the UE to the UE.

As another example, the BS may indicate/configure an operation of discarding/initializing the measurement value previously acquired by using the RS resource(s) and/or the RS resource set(s) regardless of/apart from the new beam setting reporting/request operation of the UE. For example, the BS may configure an RS resource(s) in which the periodicity is X, and configure periodic (P)/semi-persistent (SP) reporting in which the periodicity is Y (>X) with CSI reporting (e.g., M-best RS index(es) reporting) therefor. In addition, the BS configures the aperiodic (AP) CSI reporting to the UE to receive a report for the measurement value (e.g., RSRP/RSRQ/SINR, etc.) before reporting the M-best RS index(es). Based on the measurement values reported from the UE, when the quality of the transmitted DL TX beam is low, the BS may indicate, to the RS resource(s) and/or RS resource set(s) which are periodically transmitted, an operation of changing the DL TX beam(s), and discarding/initializing the measurement value previously acquired by the UE together with the change of the DL TX beam(s).

As described above, when transmitting the new beam setting reporting request, the UE may discard/initialize the previously acquired measurement value. A method may be considered, which initializes measurement for a desired channel and initializes a measurement value for the interference channel.

The UE may ignore/exclude the measurement value(s) for the channel/beam acquired by using the resources (e.g., CSI-IM resource(s) and/or NZP CSI-RS resource(s) and/or ZP CSI-RS resource(s) for interference measurement) configured in order to measure the interference channel after the new beam setting reporting/request.

For example, after the new beam setting reporting/request, the UE may operate restrictively only when the operation of initializing/discarding the currently/previously acquired measurement value is configured not to perform the interference measurement by using an interference measurement resource(s) and/or resource set(s). As an example, the UE may operate restrictively only when a setting parameter of the interference measurement resource (IMR) and/or resource set is set to "off".

Since the new beam setting reporting/request operation of the UE is for beam management and/or beam correspondence between the UE and the serving cell/BS, it may be difficult to perform the new beam setting reporting/request operation by considering the interference channel/beam with the adjacent cell/BS. Since there is a UE which should effectively support a service, it may also be difficult for the adjacent cell/BS to schedule the beam while considering an interference influence. By considering such a case, the UE may initialize the previously acquired measurement value only when the UE is configured not to perform the interference measurement like the above-described example.

As another example, the UE may discard only the measurement value acquired by using the RS resource(s) and/or RS resource set(s) configured for measurement of the desired channel, and not discard the measurement value acquired through the RS resource(s) and/or RS resource set(s) configured for the interference channel measurement. The BS may configure/indicate the UE operation. As an example, the UE may discard the measurement value acquired by using the CSI-RS resource(s)/resource set(s) and/or SSB resource(s)/resource set(s) and not discard the measurement value acquired by using the CSI-IM resource(s)/resource set(s).

The TP of the serving cell/base station may change the DL TX beam for the configured RS resource(s) based on the new beam setting reporting/request of the UE, but the TP of the adjacent cell/the BS beam which exerts the interference influence on the UE may not be changed but maintained as it is. Accordingly, when the BS (centralized, which takes charge of scheduling) does not also change the TP of the adjacent cell/the beam(s) of the BS, such an operation may be appropriate. In such a case, when the UE determines a final SINR value(s), the UE may calculate the final SINR value(s) in terms of a long-term average rather than desired channel/beam measurement for the interference channel/beam management and also acquire a value having high reliability rather than discarding the interference channel/beam measurement.

As another example, the UE may discard the measurement value acquired by using the RS resource(s) and/or RS resource set(s) configured for measurement of the desired channel, and also discard the measurement value acquired through the RS resource(s) and/or RS resource set(s) configured for the interference channel measurement together. The BS may configure/indicate the operation of the UE. As an example, the UE may discard the measurement value acquired by using the CSI-RS resource(s)/resource set(s) and/or SSB resource(s)/resource set(s) and the measurement value acquired by using the CSI-IM resource(s)/resource set(s).

When the BS (centralized, which takes charge of scheduling) changes/resets the DL TX beam(s) of the TP of the serving cell/the BS and also changes/resets the DL TX beam(s) of the TP of the adjacent cell/the base station, which exerts the interference influence on the UE together based on the new beam setting reporting/request, the operation of the UE may be appropriate. Alternatively, the TP of the serving cell/the base station may change the DL TX beam for the configured RS resource(s), but the beam of the TP of the adjacent cell/the BS, which exerts the interference influence on the UE may not be changed but rather maintained as it is. Accordingly, when the BS (centralized, which takes charge of scheduling) does not also change the beam(s) of the TP of the adjacent cell/the BS, such an operation will be appropriate.

In relation to the proposal, a scheme may be considered, in which the BS previously configures one or more RS resource(s) and/or RS resource set(s) and changes the RS resource(s) and/or RS resource set(s) according to the new beam setting reporting/request of the UE.

For example, the BS may configure one or more RS resource sets (e.g., CSI-RS resource set(s), CSI-IM resource set(s), etc.) in specific RS setting. A definition/concept for the RS setting is described by referring to TS 38.214 of the above-described CSI related operation/TS 38.214 of 3GPP. The BS may configure the RS to the UE as follows. The UE may configure/indicate to perform measurement and report the CSI (e.g., CRI/RSRP, etc.) only for RS resource set #1 by defining/setting RS resource set #1 and RS resource set #2 in one RS setting and configuring the reporting setting for the RS setting. When the UE reports/requests the new beam setting, the BS may command/indicate the UE to change an RS resource set(s) subjected to measurement and/or CSI reporting execution. The command/indication of the BS may be performed in a dynamic form such as DCI, etc., and a semi-dynamic form such as MAC-CE signaling. This is particularly required so as to recognize the UE to perform an appropriate operation by immediately reflecting the new beam setting reporting/request of the UE. As another method, the BS changes/reconfigures the reporting setting (dynamically and/or semi-dynamically) by interlocking with the new beam setting reporting/request operation, and as a result, the UE may change the RS resource set(s) to be measured and/or reported.

Additionally, discarding/initializing the previously acquired measurement value may be indicated to the UE by interlocking with an RS resource(s) and/or RS resource set(s) switching indication of the BS mentioned above. Alternatively, the UE may recognize/regard that the TX beam(s) of the BS is changed without a separate indication and automatically perform the operation of discarding/initializing the previously acquired measurement value. Since a specific RS resource(s) may be redundantly included in/configured to different RS resource set(s) together, some or all of the previous RS resource(s) may be included in the switched RS resource set in spite of switching the RS resource set(s). Thus, the technical attribute may be required.

The above-described method (method 1) may be similarly applied/extended even to uplink (UL) beam management. In the case uplink, the BS may command/indicate the UE to configure/use a new UL TX beam. This is named as an uplink new beam setting indication/command. This may correspond to the above-described new beam setting request/reporting, and replaced with the above-described new beam setting request/reporting and used. The BS may configure multiple SRS resource(s) and/or SRS resource set(s) to the UE, and each SRS resource and/or SRS resource set may be used for beam management. The UE periodically transmits the SRS resource(s) while changing the TX beam and the BS acquires the measurement value (e.g., RSRP/RSRQ/SINR, etc.) based on the SRS resource(s) and when the measurement value is lower than a specific threshold value, the BS may indicate/configure the UE to change a set of TX beam(s) and/or TX beam(s) from a next periodicity. That is, the BS may transmit the uplink new beam setting indication/command to the UE. Here, the TX beam means a mean which the UE transmits to the BS. As with the case of downlink, there is an advantage in that unnecessary delay and/or overhead may be reduced in finding an appropriate/best UE TX beam(s).

The BS may configure one or more (multiple) SRS resource(s) and/or resource set(s) (e.g., SRS resource set(s) for beam management), and configure/indicate an SRS resource set(s) switching operation so as for the UE to change the UL TX beam(s) based on the measurement value for the SRS resource(s) transmitted by the UE. Alternatively, when the quality of the UL TX beam(s) of the UE, which is transmitted through a specific SRS resource and/or SRS resource set(s) is not good (e.g., when the measurement value such as RSRP/RSRQ/SINR, etc. is smaller than a specific threshold value), changing the UL TX beam(s) used/transmitted by the UE may be indicated/configured for the specific SRS resource and/or SRS resource set(s). The UL TX beam change may be interpreted even as changing a transmit filter. The new beam setting indication/configuration/command of the BS to the UE may be performed through dynamic signaling such as MAC-CE. More specifically, the following may be considered.

The BS may indicate/command the UE to use a beam(s) different from or the same as the UL TX beam(s) transmitted to periodic (P)/aperiodic (AP)/semi-persistent (SP) SRS resource(s) and/or SRS resource set(s) (SRS most recently transmitted based on the indicated time) legacy transmitted by additionally allocating bit(s) of 1 or more to the DCI.

For example, in the case of the periodic (P)/semi-persistent (SP) SRS (after the semi-persistent SRS is activated), when transmitting the currently/previously configured SRS resource(s) and/or SRS resource set(s) through separate MAC-CE signaling and/or DCI signaling, the BS may indicate/command the UE to change the UL TX beam(s) (e.g., new beam setting indication/command). The BS may configure/indicate the UE to change the UL TX beam for the SRS resource(s) transmitted after +k (>0) time units (e.g., symbol(s), slot(s), or millisecond(s)) based on the new beam setting indication/command time of the BS. The BS may set the k value through signaling such as RRC, etc. An offset between the indication/command time of the BS and the beam change time of the UE may be required to remove ambiguity of the UE operation when the indication/command time of the BS and the SRS transmission time of the UE overlap with each other.

In regard to the uplink beam management, an operation of initializing the measured value acquired by the BS may be determined by interlocking with the capability of the UE. The BS may configure/indicate the UE to a different TX beam(s) from the next SRS resource transmission periodicity, and in this case, whether the UE transmits a new TX beam may vary depending on time units (e.g., symbol(s), slot(s), or millisecond(s)) between the indication time of the S and the SRS transmission time. The reason is that the number of symbols/slots required for setting the new TX beam by reflecting the UE capability and the indication of the BS may vary depending on the U capability and the indication of the BS.

For example, as described above, the BS may configure, to the BS, the RS resource(s) and/or RS resource set(s) transmitted at a periodicity of X (milliseconds or slot(s)) and configure to report an M-best RSRP/RSRQ measurement result therefor at a periodicity of Y (milliseconds or slot(s)). In this case, in order to sufficiently secure measurement accuracy for each RS resource(s), a CSI reporting periodicity may be even larger than X (i.e., Y>X), and the M-best RSRP/RSRQ measurement value(s) for the configured RS resource(s) is excessively low, and as a result, the TX/RX beam corresponding to the corresponding RS resource(s) may not be used even though the M-best RSRP/RSRQ measurement value(s) is(are) reported to the BS. In this case, the UE should perform the CSI measurement unnecessarily persistently, and since the BS may not know the quality of the beam for the RS resource configured until the UE reports the CSI, the BS will change the TX beam again after the UE reports the CSI. Since the BS should wait up to a reporting time such as the CSI such as next M-best RSRP/RSRQ, etc., again after the change, the time delay may finally increase in matching the beam correspondence. Further, it may be considered that data transmission/reception overhead increases in view of abandoning significant data transmission/reception in order to perform unnecessary RS transmission and measurement. Accordingly, unnecessary delay and/or overhead for appropriate transmission/reception beam setting/determination/selection between the BS and the UE may be reduced through the above-described proposal method.

Additionally, by interlocking with the new beam setting reporting/request of the UE or regardless of the new beam setting reporting/request, the BS may indicate, to the UE, that the transmission beam of the TP/TRP/BS transmitted for some or all RS resource(s) and/or RS resource set(s) currently/previously configured is changed from a specific time. The UE that receives such an indication may perform an operation of discarding the previously acquired measurement value automatically for the RS resource(s) and/or RS resource set(s) in which the transmission beam of the BS is changed. Therefore, similarly as described above, an effect of being capable of reducing delay and/overhead for matching TX/RX beam correspondence between a transmitter and a receiver may be obtained.

FIG. 17 illustrates an example of operation flowcharts of the BS and the UE which operate according to the above-described method. FIG. 17(a) illustrates a case of downlink and FIG. 17(b) illustrates a case of uplink. Referring to FIGS. 17(a) and 17(b), the BS may transmit, to the UE, a configuration/configuration information for the RS (S1710-a/S1710-b). In the case of the downlink, the BS may indicate, to the UE, that the downlink beam transmitted to the RS resource(s) and/or RS resource set(s) is to be changed from a specific time (S1720-a). In the case of the uplink, the BS may indicate, to the UE, that the uplink beam transmitted to the RS resource(s) and/or RS resource set(s) is to be changed from a specific time (S1720-b).

As described above, the BS may configure/indicate the UE to perform measurement of RSRP, RSRQ, or SINR based on the CSI-RS in which a time-domain behavior is configured to be "periodic" or "semi-persistent" to the UE, and configure periodic/semi-persistent CSI reporting at an even longer periodicity than the CSI-RS transmission periodicity and report M (>=1)-best CRI(s).

When RSRP (or RSRQ or SINR) measurement values for some or all of the CSI-RS resource(s) are lower than a specific threshold value (or when an average of the M(>=1)-best RSRP value is lower than a specific threshold value), based on RSRP, SINR, or RSRQ measured during a specific periodicity or several periodicities for the periodically transmitted CSI-RS resource(s), the UE may request new transmission beam setting to the BS. Alternatively, the BS may configure/indicate the operation of the UE.

For example, even though there is no configuration/indication of the BS, the UE may request to change the transmission beam set of the TP/BS for the periodically transmitted CSI-RS resource(s) or CSI-RS resource set(s) with a grant-free scheme. Further, the UE may request to change the transmission beam set for a specific RX panel of the UE. As an example, the UE may report, to the BS, an RX panel ID of the UE together during the new beam setting reporting/request. Such a technical attribute may be used in a URLLC environment.

As another example, the BS may configure/indicate aperiodic CSI reporting so as to request the UE to change the beam set. As an example, the report quantity may include contents such as "new-beam-request" for requesting new beam(s) setting. Further, the UE may request to change the transmission beam set for a specific RX panel of the UE. As an example, the UE may report, to the BS, an RX panel ID of the UE together during the new beam setting reporting/request. The UE may ignore measurement of RSRP, RSRQ, or SINR for the CSI-RS resource(s) transmitted before reporting/requesting new beam setting, and the UE may reflect only the CSI-RS transmitted after requesting the new beam setting (or after a specific guard time (guard symbol) after the new beam setting reporting/request by considering that the BS is to change the transmission beam) onto calculation of M (>=1)-best CRI(s) and/or RSRP(s).

The new beam setting reporting/request may be configured by interlocking with the CRI(s) or CRI(s) and RSRP(s) (or RSRQ or SINR) reporting periodicity. For example, it is assumed that after the specific CSI-RS resource(s) and/or CSI-RS resource set(s) are/is transmitted periodically four times, M(>=1)-best CRI reporting is indicated to the UE. In this case, the BS may indicate/configure the UE to report the new beam setting request/reporting with 1 bit at every periodicity in which the CSI-RS is transmitted.

FIG. 18 illustrates an example of performing the new beam setting reporting/request at every CSI-RS transmission periodicity. FIG. 18 is just an example for convenience of description, and does not limit the technical scope of the present disclosure.

Referring to FIG. 18, as an example, if all of M best RSRP values among RSRP measurement values for a CSI-RS resource(s) transmitted at a specific periodicity exceed a specific threshold value, the UE may be configured/indicated to report '0' and if not, the UE may be configured/indicated to report '1'. It may be assumed that after reporting the new beam setting (that is, reporting '1'), the BS sets/transmits a different transmission beam to the CSI-RS, and the UE may not use the previous RSRP measurement value for calculating the RSRP for reporting M(>=1)-best CRI(s) and/or RSRP(s). Such an operation may be configured/indicated to be performed for each specific panel of the UE.

As another example, the new beam setting reporting/request is configured to the UE at the same periodicity as a CSI-RS transmission periodicity X (ms) or a periodicity of K×X (ms) and CRI(s) and/or RSRP reporting is configured/indicated at a periodicity of L (>K)×X (ms) to perform an operation of requesting the new beam if the strength and/or quality of the transmission beam is not good before finally calculating the CRI and/or RSRP similarly as the example.

<Method 2>

When the UE reports channel state information (CSI) contents indicated from the BS, the UE may be configured/indicated with multiple CSI reporting times as a candidate(s)/resource(s) (or resource set(s), etc.) in which CSI reporting is possible through higher layer signaling such as RRC and/or dynamic signaling such as DCI/MAC-CE, etc., not one specific time, and configured/indicated to perform the CSI reporting by using some or all of the multiple CSI reporting times. For example, there are a total of 10 candidates/resources in which the CSI reporting is possible and if the CSI reporting is performed by only one of 10 candidates/resources, a resource(s) for reporting, such as a time/frequency configured as candidates/resources in which the CSI reporting is possible after the CSI reporting time becomes not valid (is expired), and as a result, the corresponding resource(s) may not be used for the CSI reporting. In other words, the method is different from a method of setting the aperiodic reporting time to be dedicated multiple times.

The above-described attribute may be effectively used when the BS indicates/configures the UE to select and use a beam in which an RSRP value acquired by performing measurement for the CSI-RS resources and/or SS/PBCH block resources configured to the UE exceeds a specific threshold value.

FIG. 19 illustrates an example of an operation sequence of a UE which operates based on reporting candidates to which a method and/or an embodiment proposed in the present disclosure is applicable. FIG. 19 is just an example for convenience of description, and does not limit the technical scope of the present disclosure.

Referring to FIG. 19, a UE may receive configuration information from a BS (S1910). The configuration information may include configuration information for a reference signal. The UE may receive, from the BS, configuration information related to CSI reporting (S1920). The configuration information related to the CSI reporting may include configuration information for reporting candidates for the CSI reporting. The UE may be configured with a CSI reporting candidate resource based on information on a reporting candidate and may perform reporting to the BS through at least one of the configured candidate resources.

For example, when the BS indicates to select and report a CSI-RS resource in which the RSRP value exceeds a specific threshold value for CSI-RS resources included in an aperiodic CSI-RS resource set, since the CSI-RS resource may be selected even though beam sweeping of the BS and the UE is not performed, if there is a candidate in which the CSI reporting is possible in the middle of transmitting the aperiodic (AP) CSI-RS resource set, the corresponding CRI may be reported at a reporting candidate time, and RX beam sweeping and/or default rate matching and/or RSRP measuring operation may be stopped.

As an example, for aperiodic CSI-RS and/or semi-persistent (SP)/periodic (P) CSI-RS in which a measurement restriction is configured to "on", when the CSI-RS resource(s) is transmitted for the TX beam sweeping operation consecutively over N slots, if a maximum RSRP measured in an n (<=N)-th slot exceeds a specific threshold value, the corresponding CRI may be reported and rate matching may not be performed as a default in subsequent slots or symbols. Further, as an example, a slot offset for aperiodic CSI reporting may be indicated/configured as several candidates. Further, as an example, basically, the CSI measurement may not be performed for a symbol(s) or slot(s) in which rate matching is not performed. When the CSI-RS resource(s) is transmitted for the TX beam sweeping operation consecutively over N slots, the largest RSRP may be measured in an n-th slot and if an average value of RSRPs of an n+1 (<=N)-th slot is smaller than an average value of RSRPs of the n-th slot, measurement may be stopped in the n+1-th slot and the best CRI may be reported.

As another example, for the aperiodic CSI-RS and/or semi-persistent (SP)/periodic (P) CSI-RS in which the measurement restriction (MR) is configured to "on", when the CSI-RS resource(s) is transmitted for the TX beam sweeping operation consecutively over N slots, if a maximum RSRP measured in an n (<=N)-th slot exceeds a specific threshold value, the corresponding CRI may be reported and rate matching may not be performed in subsequent slots. The slot offset for the aperiodic (AP) CSI reporting may be indicated/configured as several candidates. The rate matching may not be performed as a default for slots in which the CSI measurement ends. When the CSI-RS resource(s) is transmitted for the TX beam sweeping operation consecutively over N slots, the largest RSRP may be measured in the n-th slot and if the average value of RSRPs of the n+1 (<=N)-th slot is smaller than the average value of RSRPs of the n-th slot, measurement may be stopped in the n+1-th slot and the best CRI may be reported.

As another example, a case of a best beam among 16 transmission beams may be assumed. A case is considered, in which a total of 16 CRI-RS resources are periodically transmitted and the periodicity of M (>=1)-best CRI and/or M(>=1)-best CRI/RSRP reporting is even longer than the CSI-RS transmission periodicity. When 16 beam qualities are not good, it may be preferable to help the BS to set the new beam by reporting/requesting the new beam after a specific periodicity rather than measuring RSRPs for the same 16 beams persistently up to the M(>=1)-best CRI reporting time. In this case, a CSI reporting candidate(s)/resource(s) capable of reporting/requesting the new beam setting may be appropriately configured by considering the CSI-RS transmission periodicity before the M (>=1)-best CRI reporting time. For example, when the reporting time is set so that the M-best CRI reporting is performed after the CSI-RS resource(s) is transmitted a total of four times, three CSI reporting candidate(s) are configured and the CSI is configured to be reported one time of three CSI reporting candidates to configure one new beam setting reporting/request to be performed.

FIG. 20 illustrates an example of multiple candidates of a CSI reporting instance in which a UE requests another set of a beam(s) in a specific reporting instance and a BS changes a beam(s), to which a method proposed in the present disclosure is applicable. Here, the instance may be interpreted as a meaning of the resource. Referring to FIG. 20, it is illustrated that the UE may perform a reporting/request of requesting DL TX beam change/resetting to the BS by using one of multiple reporting candidates. Specifically, the UE may be configured/indicated from the BS so as to report M-best CRI(s), and may perform measurement by using the RS resource(s) configured therefor and transmit, to the BS, the new beam setting request/report last in slot #1. A resource for a subsequent reporting candidate(s) may be automatically expired and not used.

As an example, for the periodic (P)/semi-persistent (SP) CSI-RS, when multiple CSI-RS resources are transmitted for the TX beam sweeping operation in a single slot, the UE may request another TX beam(s) set if maximum measured largest RSRP is lower than a specific threshold value (required level). When requesting another TX beam(s) set, the best CRI may be reported to be referred to by the BS. In order to reduce feedback/reporting overhead, the BEST CRI may be reported only with 1-bit resources so as to request only another set of the beam(s).

Since the BS need not perform several aperiodic CSI reporting settings to the UE through the proposal method, and the UE may have the degree of freedom to report the CSI at several time instances of which time interval is not large, there is an advantage in that the CSI may be immediately reported when a change request is required by determining the beam quality for the DL beam(s) of a desired channel and/or interference channel of the TP/BS. Consequently, since the BS may also schedule the beam by reflecting the report of the UE, there is an advantage in that unnecessary delay and/or overhead may be reduced.

FIG. 21 illustrates an operation flowchart of a UE which performs beam-related reporting to which a method proposed in the present disclosure is applicable. FIG. 21 is just for convenience of the description and does not limit the scope of the present disclosure. Referring to FIG. 21, it is assumed that the UE and/or the BS operate(s) based the methods and/or embodiments of Methods 1 to 2 described above. Some of steps described in FIG. 21 may be merged or omitted. Further, a state in which an initial access procedure is completed is assumed. The initial access procedure may be performed by referring to FIGS. 6 and 8, and related descriptions.

A UE may receive configuration information from a BS (S2110). The configuration information may include configuration information related to beam reporting. For example, the configuration information may include information on measurement information (e.g., CSI reporting for beam reporting). As an example, the configuration information may include information on a reporting periodicity or a reporting time of the measurement information. As an example, multiple resources for beam-related reporting may be configured within the reporting periodicity or the reporting time. As an example, the configuration information may include resource information for transmission of information related to a beam change request. A periodicity at which a reference signal is transmitted may be set to be shorter than the reporting periodicity of the measurement information.

Further, the configuration information may include configuration information related to the reference signal. For example, the configuration information related to the reference signal may include information for the periodicity at which the reference signal is transmitted and time domain behavior information of the reference signal. Further, the configuration information may include information on a resource and/or a resource set in which the reference signal is transmitted. As an example, a configuration for the resource and/or the resource set in which the reference signal is transmitted may be based on Methods 3 and 3-1 to be described below. A "repetition" may be configured in the resource set in which the reference signal is transmitted and a frequency domain RE distance may be set to be the same between resources in the corresponding resource set.

For example, the configuration information may include a configuration related to CSI reporting, and a report quantity in the configuration related to the CSI reporting may be configured to "no-report". As an example, the configuration information may include a configuration (e.g., reportQuantity) related to the reporting of the measurement information, and the configuration related to the reporting may be an indication (e.g., no-report) of skipping the reporting of the measurement information.

For example, an operation of the UE (e.g., reference numeral 100 and/or 200 in FIGS. 24 to 28) which receives the configuration information from a BS (reference numeral 100/200 in FIGS. 24 to 28) may be implemented by apparatuses in FIGS. 24 to 28 to be described below. For example, referring to FIG. 25, one or more processors 202 may control one or more transceivers 206 and/or one or more memories 204 so as to transmit the configuration information and one or more transceivers 206 may receive the configuration information from the BS.

The UE may receive a reference signal (RS) from the BS (S2120). The reference signal may be received based on the configuration information. The reference signal may be transmitted from the BS periodically, semi-persistently, or aperiodically.

For example, an operation of the UE (reference numeral 200 and/or 24 in FIGS. 24 to 100) which receives the reference signal (reference numeral 100/200 in FIGS. 24 to 28) may be implemented by the apparatuses in FIGS. 24 to 28 to be described below. For example, referring to FIG. 25, one or more processors 202 may control one or more transceivers 206 and/or one or more memories 204 so as to receive the reference signal, and one or more transceivers 206 may receive the reference signal from the BS.

The UE may perform measurement based on the reference signal (S2130).

The UE may transmit, to the BS, information related to abeam change request based on a measurement value and a threshold value for the reference signal (S2140). In other words, the UE may determine whether to request a beam change based on the measurement value and the threshold value, and transmit, to the BS, the information related to the beam change request. An operation of determining whether to request the beam change and transmitting the information related to the beam change request may be base don Methods 1 and 2 described above.

For example, the information related to the beam change request may include a request for a new beam different from a currently configured beam. As an example, the request for the new beam may be a change request of a transmission beam for a specific reception panel of the UE. The UE may transmit panel information (e.g., panel ID) of the UE together with the information related to the beam change request. Alternatively, the information related to the beam change request may include a request of changing beams corresponding to some of multiple reference signal resources configured to the UE. Alternatively, the information related to the beam change request may include a request of changing a beam of a neighboring cell, which causes interference to the UE.

For example, the threshold value may be set based on reception power information (e.g., RSRP/RSRQ) acquired in an initial access step or a beam management step. FIG. 8 and the related description may be referred to for the initial access step, which may be performed before step S2110. FIG. 10 and the related description may be referred to for the beam management step, which may be performed together with or before step S2130. As an example, a threshold value may be set to an average value of upper Y % among the reception power information, and the Y may be set by the BS. For example, multiple candidates of the threshold value may be configured through RRC signaling, and at least one value of the candidates may be configured/indicated through MAC-CE/DCI. As an example, the threshold value may be set differently according to a distance between the BS and the UE. As an example, the threshold value may be set for each specific RS resource set/group. As an example, the threshold value may be set for each cell or TP.

For example, in (i) a case where the number of measurement values, which exceeds the threshold value is smaller than the number of beams to be reported, (ii) a case where all of the measurement values is smaller than the threshold value, or (iii) a case where one of the measurement values is smaller than the threshold value, the UE may determine the beam change request and transmit the information related to the beam change to the BS.

For example, the transmission of the information related to the beam change request may be performed before the reporting periodicity or the reporting time. As an example, the transmission of the information related to the beam change request may be performed before the CSI reporting periodicity or reporting time for the beam reporting. As an example, the information related to the beam change request may be transmitted at every transmission periodicity of the reference signal. When the information related to the beam change request is transmitted, the information related to the beam change request may be transmitted with a grant-free scheme of the BS. As an example, the UE may transmit, to the BS, the information related to the beam change even when a report quantity of a configuration (e.g., CSI reportconfig.) related to the CSI reporting is configured to "no-report" based on the configuration information. As an example, even when an indication (e.g., no-report) of skipping the reporting of the measurement information based on the configuration (e.g., reportQuantity) related to the reporting of the measurement information is received, the information related to the beam change may be transmitted to the BS.

For example, an operation of the UE (reference numeral 100/200 in FIGS. 24 to 28) in steps S2130 and S2140 described above, which performs measurement based on the reference signal and transmitting, to the BS (reference numeral 100/200 in FIGS. 24 to 28), information related to the beam change request may be implemented by the apparatuses in FIGS. 24 to 28 to be described below. For example, referring to FIG. 25, one or more processors 202 may perform the measurement based on the reference signal, control one or more transceivers 206 and/or one or more memories 204 so as to transmit the information related to the beam change request, and one or more transceivers 206 may transmit the information related to the beam change request from the BS.

The UE may transmit, to the BS, measurement information (S2150). The measurement information may correspond to a CSI for beam reporting. Further, the measurement information may be information acquired based on reception power of the UE. As an example, the measurement information may include at least one of L1-RSRP, RSRQ, and SINR. The measurement information may be calculated by excluding a value measured before transmitting the information related to the beam change request.

For example, a value measured before time units (e.g., symbol(s), slot(s), or millisecond(s)) of a specific value based on a time when the UE transmits the information related to the beam change request may be excluded. Alternatively, a value measured before time units (e.g., symbol(s), slot(s), or millisecond(s)) of a specific value based on a time when the UE transmits the information related to the beam change request and receives a response signal of granting the beam change from the BS may be excluded. As an example, the UE may determine a value which is excluded based on the transmission periodicity of the reference signal and a time used for the beam change of the BS. The UE may receive, from the BS, information related to a time required for the BS to change the beam. Specifically, (i) when the information related to the beam change request is transmitted before a previous time equal to the time required for the beam change at a time when a next reference signal is to be transmitted, a value measured up to the present time and (ii) when the information related to the beam change request is transmitted after the previous time as long as the time required for the beam change at the time when a next reference signal is to be transmitted, a measurement value based on the reference signal of the present time and the next periodicity may also be excluded.

For example, when the measurement information is calculated, a measurement for the interference channel measured before transmitting the information related to the beam change request may also be considered together. For example, when the interference channel measurement value is considered, the calculation may be performed by using one method of (i) a calculation by excluding both the channel measurement value and the interference channel measurement value, (ii) a calculation by excluding only the channel measurement value and without excluding the interference channel measurement value, or (iii) a calculation by excluding only the channel measurement value only when interference measurement is configured not to be performed. As an example for case (iii), only when a setting parameter of the interference measurement resource (IMR) and/or resource set is set to "off", the calculation may be performed by excluding the measurement value for the interference channel. The BS may indicate/configure one of the above-described methods to UE.

For example, when multiple reporting candidate resources for the beam-related reporting are configured based on the configuration information, the UE may transmit, to the BS, at least one of the measurement information or the information related to the beam change request through at least one of the configured candidate resources.

Further, when transmitting the measurement information for transmitting at least one of the information related to the beam change request or the measurement information through one of the multiple resources, the UE may stop at least one of the rate matching or measurement operation.

For example, an operation of the UE (e.g., reference numeral 200 and/or 24 of FIGS. 24 to 28) which transmits the measurement information to the BS (100/200 in FIGS. 24 to 28) in step S2150 described above may be implemented by apparatuses in FIGS. 24 to 28 to be described below. For example, referring to FIG. 25, one or more processors 202 may control one or more transceivers 206 and/or one or more memories 204 so as to transmit the measurement information and one or more transceivers 206 may transmit the configuration information from the BS.

Through the above-described methods and embodiments, when it is determined that there is a problem in the configured beam, the beam change is rapidly requested, thereby improving delay and overhead increase. Further, the above-described methods and embodiments are described based on a downlink operation, but may be applied even to an uplink operation, of course. In this case, a role of the UE/BS in steps S2120 to S2140 may be interpreted as an opposite operation. Further, the UE and/or the BS which operate according to each of the steps of the methods and embodiments, FIG. 16/17/19/21, etc., may be specifically implemented by the apparatuses in FIGS. 24 to 28 to be described below. For example, the BS may correspond to a first wireless device and the UE may correspond to a second wireless device and in some cases, an opposite thereto may also be considered.

For example, the BS/UE signaling and operation (e.g., FIGS. 16 to 17) may be processed by one or more processors (e.g., 102 and 202) in FIGS. 24 to 28 and the BS/UE signaling and operation (e.g., FIGS. 16 to 21) may be stored in a memory (e.g., one or more memories (e.g., 104 and 204) in FIGS. 24 to 28) in the form of a command/program (e.g., instruction and executable code) for driving at least one processor (e.g., 102 and 202) in FIGS. 24 to 28.

<Method 3>

A PDSCH/PDCCH scheduling restriction may be applied to an SS/PBCH block for L3/L1-RSRP measurement. Accordingly, OFDM symbol overhead in which the PDSCH/PDCCH is not transmitted may be significantly large due to SS/PBCH block transmission. For example, when a case where the periodicity of the SS/PBCH block(s) is 5 ms and the number of SS/PBCH blocks is 64, and a subcarrier spacing (SCS) is 120 kHz considered, the number of OFDM symbol(s) in which the SS/PBCH block(s) is transmitted among the total number of symbols may occupy 45.71% and the PDSCH/PDCCH scheduling restriction may be applied to the OFDM symbol(s).

Similarly, the PDSCH/PDCCH scheduling restriction may also be similarly applied to the CSI-RS resource(s) of the CSI-RS resource set(s) in which repetition "on" is configured.

Therefore, OFDM symbol overhead due to the PDSCH/PDCCH scheduling restriction needs to be reduced by minimizing a CSI-RS symbol in which repetition "on" is configured and if possible, it may be preferable to determine a best TX/RX beam by using a CSI-RS resource set in which repetition "off" is configured rather than a CSI-RS resource set in which repetition "on" is configured from the viewpoint of low overhead due to the PDSCH/PDCCH scheduling restriction. Further, referring to Table 13, since the CRI reporting is not supported with ReportQuantity associated with the CSI-RS resource set in which repetition "on" is configured (i.e., "no report" or reportQuantity is indicated/configured to "none"), a method for performing an effective P1 operation (a beam management operation of performing both TX and RX beam sweepings) by using a repetition "off" configuration may be required.

TABLE 13

TS 38.214

When the UE is configured with higher layer parameter NZP-CSI-RS-ResourceSet and when the higher layer parameter repetition is set to 'off', the UE shall determine a CRI from the supported set of CRI values as defined in Subclause 6.3.1.1.2 of [5, TS 38.212] and report the number in each CRI report. When the higher layer parameter repetition is set to 'on', CRI is not reported."

The UE may be explicitly/implicitly configured/indicated with the same TX beam being configured/transmitted to some CSI-RS resource(s) of the CSI-RS resource set in which the higher layer parameter "repetition" is configured to "off" from the BS (the beam management operation and TS 38.331 may be referred to for a definition of the RRC parameter "repetition"). Alternatively, the UE may be explicitly/implicitly indicated/configured with the TX beam sweeping not being performed during a specific symbol duration in which the CSI-RS resource(s) of the CSI-RS resource set in which repetition is configured to "off" is transmitted. The operation/recognition of the UE is different from an original purpose of configuring repetition "off" for the TX beam sweeping, but may be required for a P1 operation (operation of finding a best or appropriate TX-RX beam) for effectively finding a transmission/reception TX-RX beam correspondence.

As another method, when a specific CSI-RS resource(s) with which the UE is configured is included in both the CSI-RS resource set with repetition "off" and the CSI-RS resource set with repetition "on", the UE may give a high priority to the CSI-RS resource set in which repetition "on" is configured at the time of receiving the specific CSI-RS resource(s). In other words, when the same CSI-RS resource(s) is included in both the CSI-RS resource set with repetition "off" and the CSI-RS resource set with repetition "on", the BS may not change the transmission beam of the BS at the time of transmitting the CSI-RS resource(s) by giving the high priority to the repetition "on" configuration. And/or such an operation may be recognized by the UE. The priority may be configured/indicated to be valid only temporarily/momentarily. This may be effectively utilized by distinguishing a time when the BS desires to perform the beam management operation (P-1 operation) and a time when the BS does not desire to perform the beam management operation. In particular, the configuration of the priority may be configured/indicated by interlocking with a configuration of performing multiple RX beam sweepings in a single OFDM symbol, and a technical meaning therefor may be a lot.

That is, the UE assumes that the BS configures/transmits the same transmission beam to the CSI-RS resource(s). Alternatively, the BS configures/transmits the same transmission beam to the CSI-RS resource(s). It may be effective in supporting a transmission/reception selecting/sweeping operation (P1 beam management) of a BS having multiple panels and/or a UE capable of sweeping a lot of reception beams based on such a feature.

For example, it is assumed that the UE may generate a total of different beams, and select and use one of the beams. The UE may perform the RX beam sweeping a total of 6 times. However, it is assumed that since the symbol duration is short for performing the RX beam sweeping 6 times in one symbol duration, the RX beam sweeping may be performed only up to 3 times. The BS may indicate/configure the maximum RX beam sweeping number to the UE in one symbol duration (by considering the capability of the UE, etc.). Further, it is assumed that the BS (or gNB/TP) may have a total of 4 panels and generate 5 transmission beams per panel, and select and use one of the transmission beams. The BS may perform the TX beam sweeping for 5 beams. Since only a single beam may be used at a specific time for each TX panel, it is appropriate to transmit/configure the TX beam through the CSI-RS resource in each of 4 panels at the specific time.

FIG. 22 illustrates an example for a configuration of a CSI-RS resource set and CSI-RS resources in which repetition "off" is configured for each panel. FIG. 22 is just for convenience of the description and does not limit the technical scope of the present disclosure.

Referring to FIG. 22, the CSI-RS resource set in which repetition "off" is configured is configured for each TX panel, and each CSI-RS resource set includes 10 CSI-RS resources. Each CSI-RS resource may be sequentially transmitted in ascending order of an index. That is, each CSI-RS resource may be mapped to the OFDM symbol in the ascending order of the index and 4 CSI-RS resource sets in which repetition "off" is configured may be configured as follows.

CSI-RS resource set #0 with Repetition "off"
={CSIRS resource #0-0, CSIRS resource #0-1, . . . , CSIRS resource #0-9}
CSI-RS resource set #1 with Repetition "off"
={CSIRS resource #1-0, CSIRS resource #1-1, . . . , CSIRS resource #1-9}
. . .
CSI-RS resource set #3 with Repetition "off"
={CSIRS resource #3-0, CSIRS resource #3-1, . . . , CSIRS resource #3-9}

In FIG. 22, 0, 1, . . . , 9 of CSI-RS resource set #0 may correspond to CSI-RS resource #0-0, CSI-RS resource #0-1, . . . , CSI-RS resource #0-9.

Here, two CSI-RS resources are bound in the ascending order for the CSI-RS resource index to be configured as the CSI-RS resource set in which repetition "on" is configured. That is, the CSI-RS resource set may be configured like CSI-RS resource sets #5 to #9 as follows.

CSI-RS resource set #5 with Repetition "on"
={CSI-RS resource #0-0, CSI-RS resource #0-1, CSI-RS resource #1-0, CSI-RS resource #1-1, . . . .
CSI-RS resource #3-0, CSI-RS resource #3-1}
CSI-RS resource set #6 with Repetition "on"
={CSI-RS resource #0-2, CSI-RS resource #0-3, CSI-RS resource #1-2, CSI-RS resource #1-3, . . . .
CSI-RS resource #3-2, CSI-RS resource #3-3}
. . .
CSI-RS resource set #9 with Repetition "on"
={CSI-RS resource #0-8, CSI-RS resource #0-9, CSI-RS resource #1-8, CSI-RS resource #1-9, . . . .
CSI-RS resource #3-8, CSI-RS resource #3-9}

In FIG. 22, CSI-RS resources corresponding to two symbols may be configured/defined as one CSI-RS resource set in which repetition "on" is configured. The UE may assume that for the CSI-RS resource commonly included in the CSI-RS resource set configured as repetition "off" is configured and the CSI-RS resource set configured as repetition "on", the repetition "off" configuration is disregarded and the repetition "on" is recognized, and as a result, the BS transmits/configures the same TX beam. The BS may prioritize the operation of the BS corresponding to repetition "on" for the same CSI-RS resource included in different CSI-RS resource sets in which both repetition "off" and "on" are configured. Accordingly, the UE may perform measurement of RSRP/RSRQ/SINR/SNR, etc., for four panels while performing a total of 6 RX beam sweepings during two symbols, and report, to the BS, M($>=$1)-best RSRP and/or a CSI-RS resource index(es) corresponding thereto, for the CSI-RS resource set configured as repetition "off".

For a similar P-1 beam management purpose, the priority for the on/off" configuration of "repetition" may be configured/indicated opposite to the above-described example. That is, when a specific CSI-RS resource(s) with which the UE is configured is included in both the CSI-RS resource set with repetition "on" and the CSI-RS resource set with repetition "off", the UE may give the high priority to the CSI-RS resource set in which repetition "off" is configured at the time of receiving the CSI-RS resource(s). In other words, when the same CSI-RS resource(s) is included in both the CSI-RS resource set with repetition "off" and the CSI-RS resource set with repetition "on", the BS may change the transmission beam of the BS at the time of transmitting the CSI-RS resource(s) by giving the high priority to the repetition "off" configuration. And/or such an operation may be recognized by the UE. The priority may be configured/indicated to be valid only temporarily/momentarily. This may be effectively utilized by distinguishing a time when the BS desires to perform the beam management operation (P-1 operation) and a time when the BS does not desire to perform the beam management operation.

Through the above-described proposal method, the UE may effectively support an operation (Interleaved Frequency Division Multiplexing (hereinafter, referred to as IFDM) based scheme) of finding an appropriate RX beam while changing the reception RX beam several times and may be allowed to implicitly operate in spite of not supporting a separate protocol for the IFDM operation. In particular, the priority configuration/indication of the BS and the recognition of the UE for the same CSI-RS resource included in different CSI-RS resource sets in which CSI-RS repetition "off" and CSI-RS repetition "on" are configured are added to perform P-1 beam management in a CSI framework supported in a current NR system.

In the above-described proposal method, the CSI-RS is primarily described, but this is just one example for convenience of description, and does not limit the technical scope of the present disclosure. Accordingly, the method may also be extended/applied to another UE-specific and/or cell-specific downlink reference signal in addition to the CSI-RS.

<Method 3-1>

When several CSI-RS resources of a specific CSI-RS resource set in which the higher layer parameter "repetition" is configured are transmitted/configured to the same OFDM symbol and when CSI-RS resources of different CSI-RS resource sets in which "repetition" is configured are configured/transmitted to the same OFDM symbol, an RE distance on a frequency domain in which the CSI-RS resource is configured may be restricted to be configured to be the same. And/or, when the CSI-RS resource(s) of the CSI-RS resource set in which "repetition" is configured is(are) configured/transmitted to the same OFDM symbol, the BS configures the frequency RE distance between the CSI-RS resources to be the same to implicitly indicate/configure, to the UE, the RX beam sweeping execution/operation in a single OFDM symbol. That is, when the frequency domain RE distance between the CSI-RS resources of the CSI-RS resource set in which "repetition" is configured is configured to be the same, the UE may automatically recognize that the RX beam sweeping within a single OFDM symbol may be performed. For the BS configuration, the UE may automatically recognize that data such as other PDSCH/PDCCH and/or other RSs are not transmitted together in addition to the CSI-RS resource(s).

For example, when CSI-RS resources of a specific CSI-RS resource set or different CSI-RS resource sets in which repetition is configured to "off" are configured to have the same frequency RE distance (or additionally, when the IFDM based RX beam sweeping operation is indicated/configured to the UE), the PDSCH and/or PDCCH scheduling restriction may be applied to the OFDM symbol in which the CSI-RS resource(s) is(are) transmitted/configured. That is, the UE may automatically recognize that the PDSCH, the PDCCH, and/or other RSs are not transmitted from the BS to the OFDM symbol. And/or, the UE may recognize an implicit indication for the IFDM based RX beam sweeping execution based on the configuration of the BS.

Further, when the UE is configured with the CSI-RS resource(s) of the repetition "off" CSI-RS resource from the BS at the same frequency-domain RE distance and configured or indicated with an operation of RX beam sweeping within an OFDM symbol through the higher layer signaling such as the RRC, etc., (for example, may receive a configuration/indication such as repetition "on" within a symbol), the UE may perform the IFDM based RX beam sweeping operation for 1-port CSI-RS or 2-port CSI-RS.

For example, even though the same spatial QCL is configured in the different CSI-RS resources, the UE may perform the IFDM based RX beam sweeping within a single symbol. Alternatively, even though the RX beam sweeping is performed by the IFDM scheme within a single symbol, different resources in the same symbol are received with the same RX beam, this may be recognized/defined as the spatial QCL. Alternatively, such an operation may be configured/indicated from the BS.

For example, for the repetition "on" configuration within a single symbol, the CSI-RS resources of the specific CSI-RS resource set in which repetition is configured to "on" are mapped to the RE at equal intervals on a frequency axis in a specific OFDM symbol, and as a result, the BS may implicitly indicate/configure the UE to perform the IFDM based RX beam sweeping for a single symbol duration in the corresponding symbol. That is, the UE may recognize the CSI-RS resource set in which repetition is configured to "on" like the repetition "on" configuration within a single symbol.

FIG. 23 illustrates an example of operation flowcharts of a UE and a BS to which methods and embodiments described in Methods 3 to 3-1 proposed in the present disclosure are applicable. FIG. 23 is just for convenience of description, and does not limit the technical scope of the present disclosure. Further, the CSI-RS is primarily described as an example of the reference signal in FIG. 23 and the above description, but is just for convenience of description and does not limit the technical scope of the present disclosure, and is applicable even to a case of using another reference signal.

A UE may receive, from a BS, configuration information related to a reference signal. The UE may receive configuration information related to CSI-RS (S3210). As an example, the configuration information related to the CSI-RS may include information on a resource and/or a resource set of the CSI-RS.

The UE may receive, from the BS, configuration information related to "repetition". For example, the UE may be configured with a higher layer parameter "repetition" and receive priority information of the resource or resource set of the CSI-RS according to the "repetition" configuration (or may be configured with a priority) (S2320). An operation of receiving the configuration information related to the "repetition" in step S2320 may be performed together in step S2310. That is, steps S2310 and S2320 may be merged and performed. Alternatively, the "repetition" configuration and the priority information may be included in the configuration information related to the reference signal in step S2319 and transmitted. In this case, step S2320 may be omitted.

For example, when each of the CSI-RS resources of different CSI-RS resource sets in which "repetition" is configured is configured in the same OFDM symbol, the BS may configure the RE distance on the frequency domain in which the CSI-RS resource is configured to be the same. Here, "repetition" may be configured to "on" or "off". Further, based on such a configuration, the BS may implicitly indicate/command the beam related operation to the UE.

The UE may perform the beam related operation based on the configuration information related to the reference signal and the configuration information related to "repetition" (S2330).

For example, the UE may perform measurement for determining the quality of the TX beam while changing multiple reception beams within a single symbol and/or between symbols based on a time-frequency RE density of the configured CSI-RS resource.

For example, in the CSI-RS resource commonly included in the CSI-RS resource set in which repetition is configured to "on" and the CSI-RS resource set in which repetition is configured to "off", the priority of the "on" configuration may be set to be high. In this case, the UE may operate by assuming that the BS configures/transmits the same transmission beam and the BS may configure the same transmission beam in the same CSI-RS resource(s). Alternatively, the priority of the "off" configuration may be set to be high. In this case, the BS may perform beam sweeping in the CSI-RS resource(s). That is, the BS may perform the beam related operation by the IFDM based scheme in a single OFDM symbol.

For example, when the frequency domain RE distance between the CSI-RS resources of the CSI-RS resource set in which "repetition" is configured is configured to be the same based on the configuration information related to the reference signal and the configuration information related to "repetition", the UE may perform the configuration IFDM based RX beam sweeping within a single OFDM symbol. Further, the UE may recognize that data such as other PDSCH/PDCCH and/or other RSs are not together transmitted in addition to the CSI-RS resource(s), based on the configuration.

Through the above-described methods and embodiments, a P1 operation (an operation of finding a best or appropriate TX-RX beam) for effectively finding a TX-RX beam correspondence may be performed, and overhead required for the beam related operation may be improved. Further, in the methods and embodiments, the UE and/or the BS which operate according to each of the steps of FIG. 23 may be specifically implemented by apparatuses in FIGS. 24 to 28 to be described below. For example, the BS may correspond to a first wireless device and the UE may correspond to a second wireless device and in some cases, an opposite thereto may also be considered.

For example, the BS/UE signaling and operation (e.g., FIG. 23, etc.) may be processed by one or more processors (e.g., 102 and 202) in FIGS. 24 to 28 and the BS/UE signaling and operation (e.g., FIG. 23, etc.) may be stored in a memory (e.g., one or more memories (e.g., 104 and 204) in FIGS. 24 to 28) in the form of a command/program (e.g., instruction and executable code) for driving at least one processor (e.g., 102 and 202) in FIGS. 24 to 28.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 24 illustrates a communication system applied to the present disclosure.

Referring to FIG. 24, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 25 illustrates wireless devices applicable to the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Present Invention is Applied

FIG. 26 illustrates a signal processing circuit for a transmit signal.

Referring to FIG. 26, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 26 may be performed by the processors 102 and 202 and/or the transceivers 106 and 206 of FIG. 25. Hardware elements of FIG. 26 may be implemented in the processors 102 and 202 and/or the transceivers 106 and 206 of FIG. 25. For example, blocks 1010 to 1060 may be implemented in the processors 102 and 202 of FIG. 25. Further, blocks 1010 to 1050 may be implemented in the processors 102 and 202 of FIG. 25 and the block 1060 of FIG. 25 and the block 1060 may be implemented in the transceivers 106 and 206 of FIG. 25.

A codeword may be transformed into a radio signal via the signal processing circuit 1000 of FIG. 26. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 26. For example, the wireless device (e.g., 100 or 200 of FIG. 25) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 27 illustrates another example of a wireless device applied to the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 25. For example, the transceiver(s) 114 may include the one or more transceivers 106 and 106 and/or the one or more antennas 108 and 108 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 24), the vehicles (100*b*-1 and 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Invention is Applied

FIG. 28 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 28, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 27, respectively The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method for performing a beam related report in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method of reporting, by a user equipment (UE), information in a wireless communication system, the method comprising:
   receiving configuration information related to a reference signal (RS) from a base station (BS);
   receiving, from the BS, the RS based on the configuration information;
   obtaining measurement values including at least one of a RSRP (reference signal received power) or a SINR (Signal to Interference plus Noise Ratio) based on the RS;
   reporting, to the BS, information on a beam switching based on the measurement values and a threshold value; and
   reporting, to the BS, the measurement values,
   wherein the configuration information includes information on a reporting periodicity or a reporting time of the measurement values,
   wherein the information on the beam switching is reported before the reporting periodicity or the reporting time of the measurement values, and
   wherein the information on the beam switching includes a request for switching a beam of a neighboring cell, which causes interference to the UE.

2. The method of claim 1, wherein the configuration information includes a configuration related to reporting of the measurement values.

3. The method of claim 1, wherein the threshold value is configured based on reception power values measured in an initial access step or a beam management step.

4. The method of claim 1, the information on the beam switching is reported based on (i) a number of the measurement values exceeding the threshold value being smaller than a number of beams to be reported, (ii) all of the measurement values being smaller than the threshold value, or (iii) a one of the measurement values being smaller than the threshold value.

5. The method of claim 1, wherein the request for switching beams includes a request for switching beams corresponding to some of a plurality of reference signal resources configured to the UE.

6. The method of claim 1, wherein the information on the beam switching is reported at every transmission periodicity of the reference signal.

7. The method of claim 1, wherein the measurement values are obtaining based on excluding a value measured before reporting the information on the beam switching.

8. The method of claim 7, wherein the value which is excluded is determined based on the transmission periodicity of the reference signal and a time used for the beam switching of the BS.

9. The method of claim 1,
   wherein multiple resources for the reporting the information are configured within the reporting periodicity or the reporting time based on the configuration information, and
   wherein at least one of the information on the beam switching or the measurement values are transmitted through one of the multiple resources.

10. The method of claim 9, wherein, based on the measurement values are reported, at least one of rate matching or a measurement operation is stopped.

11. A user equipment (UE) reporting information in a wireless communication system, the UE comprising:
one or more transceivers;
one or more processors; and
one or more memories storing instructions for operations executed by the one or more processors and connected to the one or more processors,
wherein the operations comprise:
receiving configuration information related to a reference signal (RS) from a base station (BS);
receiving, from the BS, the RS based on the configuration information;
obtaining measurement values including at least one of a RSRP (reference signal received power) or a SINR (Signal to Interference plus Noise Ratio) based on the RS;
reporting, to the BS, information on a beam switching based on the measurement values and a threshold value; and
reporting, to the BS, the measurement values,
wherein the configuration information includes information on a reporting periodicity or a reporting time of the measurement values,
wherein the information on the beam switching is reported before the reporting periodicity or the reporting time of the measurement values, and
wherein the information on the beam switching includes a request for switching a beam of a neighboring cell, which causes interference to the UE.

12. The UE of claim 11, wherein the threshold value is set based on reception power values measured in an initial access step or a beam management step.

13. An apparatus comprising:
one or more memories; and
one or more processors functionally connected to the one or more memories,
wherein the one or more processors are configured to control the apparatus to:
receive configuration information related to a reference signal (RS) from a base station (BS);
receive, from the BS, the RS based on the configuration information;
obtain measurement values including at least one of a RSRP (reference signal received power) or a SINR (Signal to Interference plus Noise Ratio) based on the RS;
report, to the BS, information on a beam switching based on the measurement values and a threshold value; and
report, to the BS, the measurement values,
wherein the configuration information includes information on a reporting periodicity or a reporting time of the measurement values,
wherein the information on the beam switching is reported before the reporting periodicity or the reporting time of the measurement values, and
wherein the information on the beam switching includes a request for switching a beam of a neighboring cell, which causes interference to the apparatus.

* * * * *